United States Patent
Ito

(10) Patent No.: US 10,892,111 B2
(45) Date of Patent: Jan. 12, 2021

(54) ENERGY STORAGE DEVICE

(71) Applicant: GS Yuasa International Ltd., Kyoto (JP)

(72) Inventor: Shun Ito, Kyoto (JP)

(73) Assignee: GS YUASA INTERNATIONAL LTD., Kyoto (JP)

(*) Notice: Subject to any disclaimer, the term of this patent is extended or adjusted under 35 U.S.C. 154(b) by 34 days.

(21) Appl. No.: 16/071,861

(22) PCT Filed: Jan. 27, 2017

(86) PCT No.: PCT/JP2017/002971
§ 371 (c)(1),
(2) Date: Jul. 20, 2018

(87) PCT Pub. No.: WO2017/131168
PCT Pub. Date: Aug. 3, 2017

(65) Prior Publication Data
US 2019/0019633 A1    Jan. 17, 2019

(30) Foreign Application Priority Data
Jan. 28, 2016  (JP) .................. 2016-014627

(51) Int. Cl.
*H01M 2/26*    (2006.01)
*H01G 11/70*   (2013.01)
(Continued)

(52) U.S. Cl.
CPC ............. *H01G 11/70* (2013.01); *H01G 11/28* (2013.01); *H01G 11/74* (2013.01); *H01M 2/26* (2013.01);
(Continued)

(58) Field of Classification Search
CPC .................. H01M 2/20; H01M 2/30
See application file for complete search history.

(56) References Cited

U.S. PATENT DOCUMENTS

| 2009/0202901 A1 | 8/2009 | Okuda et al. |
| 2012/0148908 A1 | 6/2012 | Ito |
| 2012/0148909 A1 | 6/2012 | Ito et al. |

FOREIGN PATENT DOCUMENTS

| CN | 102569820 A | 7/2012 |
| JP | 2009-193787 A | 8/2009 |

(Continued)

OTHER PUBLICATIONS

Mukai et al. JP 2013-161719. Aug. 19, 2013. English machine translation. (Year: 2013).*

(Continued)

*Primary Examiner* — James Lee
(74) *Attorney, Agent, or Firm* — McGinn I.P. Law Group, PLLC.

(57) ABSTRACT

An energy storage device includes: a positive electrode terminal, a negative electrode terminal, an electrode assembly, a positive current collector and a negative current collector which respectively connect the positive electrode terminal and the negative electrode terminal to the electrode assembly. The positive current collector includes: a first connecting portion which is connected with the positive electrode terminal, and a second connecting portion which is connected with the electrode assembly and the first connecting portion. The first connecting portion includes: a base portion which is connected to the second connecting portion, and an attachment portion which is provided to protrude from the base portion in a direction which is opposite to a direction toward the positive electrode terminal. In the attachment portion, a through hole through which a shaft portion of the positive electrode terminal is inserted is formed.

20 Claims, 13 Drawing Sheets

(51) Int. Cl.
*H01G 11/74* (2013.01)
*H01M 2/30* (2006.01)
*H01G 11/28* (2013.01)
*H01M 4/64* (2006.01)
*H01G 11/68* (2013.01)
*H01M 4/02* (2006.01)

(52) U.S. Cl.
CPC .............. *H01M 2/263* (2013.01); *H01M 2/30* (2013.01); *H01M 4/64* (2013.01); *H01G 11/68* (2013.01); *H01M 2004/027* (2013.01); *H01M 2004/028* (2013.01)

(56) References Cited

FOREIGN PATENT DOCUMENTS

| | | |
|---|---|---|
| JP | 2012-138342 A | 7/2012 |
| JP | 2013-161719 A | 8/2013 |
| JP | 2015-097174 A | 5/2015 |

OTHER PUBLICATIONS

International Search Report (ISR) (PCT Form PCT/ISA/210), in PCT/JP2017/002971, dated May 9, 2017.

\* cited by examiner

ENERGY STORAGE DEVICE

TECHNICAL FIELD

The present invention relates to an energy storage device which includes a current collector connected to an electrode terminal.

BACKGROUND ART

As an energy storage device such as a secondary battery, there has been known an energy storage device which includes a current collector which connects an electrode assembly and an electrode terminal. For example, in a secondary battery described in patent document 1, a current collecting plate which forms a current collector is connected to an electrode group which forms an electrode assembly, and the current collecting plate is connected to a connecting portion having a circular cylindrical shape and integrally connected with an external terminal which forms an electrode terminal. A distal end of the connecting portion penetrates a through hole formed in a battery lid of a battery can which houses the group of electrodes and an opening hole formed in the current collecting plate and is swaged. With such a configuration, the external terminal and the current collecting plate are integrally fixed to the battery lid, and are electrically connected to each other.

PRIOR ART DOCUMENT

Patent Document

Patent Document 1: JP-A-2015-97174

SUMMARY OF THE INVENTION

Problems to be Solved by the Invention

It is an object of the present invention to provide an energy storage device which can enhance a strength of a connecting portion of a current collector with an electrode terminal.

Means for Solving the Problems

An energy storage device according to an aspect of the present invention includes: an electrode terminal; an electrode assembly; and a current collector which connects the electrode terminal and the electrode assembly, wherein the current collector includes: a first connecting portion which is connected with the electrode terminal; and a second connecting portion which is connected with the electrode assembly and the first connecting portion, wherein the first connecting portion includes: a base portion which is connected to the second connecting portion; and an attachment portion which is provided to protrude from the base portion in a direction which is opposite to a direction toward the electrode terminal, wherein, in the attachment portion, a through hole through which a shaft portion of the electrode terminal is inserted is formed.

Advantages of the Invention

According to the energy storage device of the present invention, it is possible to enhance a strength of the connecting portion of a current collector with an electrode terminal.

MODE FOR CARRYING OUT THE INVENTION

Figure 1:
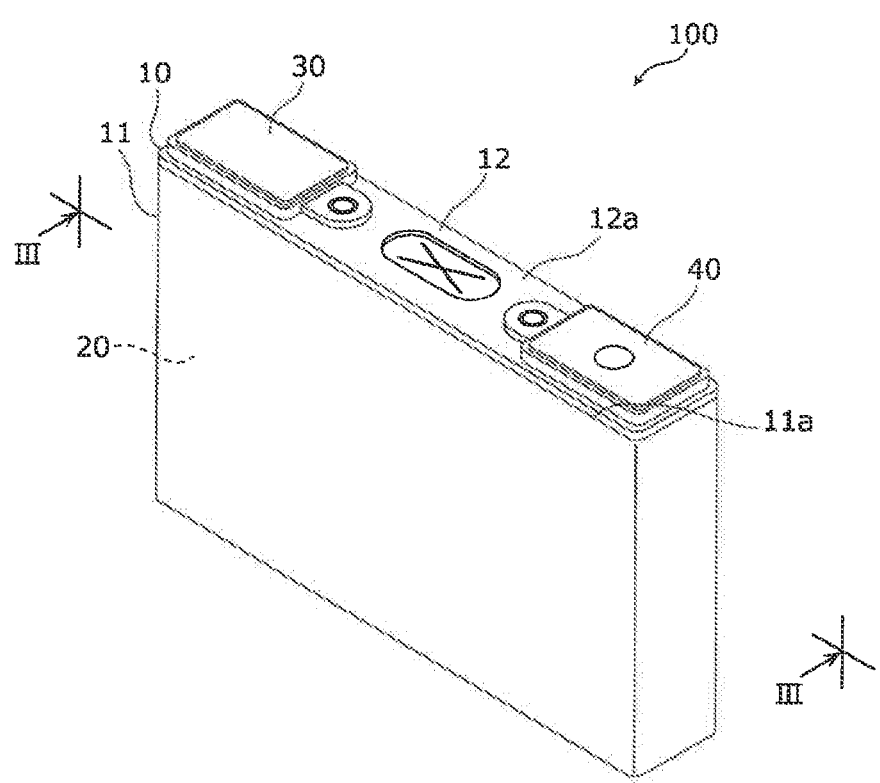
FIG. 1 is a perspective view schematically showing an external appearance of an energy storage device according to an embodiment.

Inventors of the present invention have made the following finding with respect to the technique described in the column "BACKGROUND ART". In the secondary battery described in patent document 1, the opening hole through which the connecting portion penetrates is formed in a plate-like base portion of the current collecting plate. Further, an insulating plate made of a resin material is interposed between the base portion and the battery lid. Accordingly, in swaging the connecting portion, there is a possibility that the base portion receives a pressing force in a direction toward the battery lid so that the base portion is deformed. In view of the above, the inventors of the present invention have found the following energy storage devices in various modes for enhancing a strength of the connecting portion of the current collector with the electrode terminal.

An energy storage device according to an aspect of the present invention includes: an electrode terminal; an electrode assembly; and a current collector which connects the electrode terminal and the electrode assembly, wherein the current collector includes: a first connecting portion which is connected with the electrode terminal; and a second connecting portion which is connected with the electrode assembly and the first connecting portion, wherein the first connecting portion includes: a base portion which is connected to the second connecting portion; and an attachment portion which is provided to protrude from the base portion in a direction which is opposite to a direction toward the electrode terminal, wherein, in the attachment portion, a through hole through which a shaft portion of the electrode terminal is inserted is formed.

In the above-mentioned configuration, in the first connecting portion of the current collector, the attachment portion protrudes from the base portion in a direction which is opposite to a direction toward the electrode terminal thus forming a stereoscopic structure. Such an attachment portion exhibits high rigidity and a high strength compared to an attachment portion simply formed of a flat plate member. Further, the attachment portion suppresses the deformation of the base portion which may occur when the attachment portion receives a force when the attachment portion is connected to the electrode terminal.

Accordingly, even when the attachment portion receives a force when the attachment portion is connected to the electrode terminal, the deformation of the first connection portion which may occur can be suppressed.

The attachment portion may be provided to annularly protrude from the base portion. With such a configuration, rigidity of the attachment portion which forms the annular stereoscopic structure and the surrounding of the attachment portion can be largely increased.

The base portion may include a folded portion of a plate material, the plate material forming the current collector. With such a configuration, the base portion includes the folded portion of the member, the base portion has high rigidity.

The base portion may be provided at both sides of the attachment portion. With such a configuration, in the first connecting portion, when the base portion has high rigidity, the stereoscopic structure formed of two base portions which have high rigidity and the attachment portion possesses high rigidity. Accordingly, a region of the attachment portion can be increased so that a diameter of a shaft portion of the electrode terminal and a diameter of swaged end portion of the shaft portion can be increased. As a result, an allowable electric current to the electrode terminal and a joining strength by swaging can be increased.

The attachment portion may be forming an attachment surface in which the through hole is positioned. With such a configuration, the connection of the shaft portion of the electrode terminal at the attachment portion becomes easy.

The current collector may be formed by working a plate material. With such a configuration, the current collector can be formed of the continuous plate material. Accordingly, the structure of the current collector becomes simple and a strength of the current collector can be enhanced.

Hereinafter, an energy storage device according to embodiments of the present invention is described with reference to drawings. The embodiments described hereinafter are comprehensive and specific examples of the present invention. In the embodiments described hereinafter, numerical values, shapes, materials, constitutional elements, the arrangement positions and connection states of the constitutional elements and the like are merely examples, and these are not intended to be used for limiting the present invention. Further, out of the constitutional elements in the embodiment described hereinafter, the constitutional elements which are not described in independent claims describing an uppermost concept are described as arbitrary constitutional elements.

Respective illustrations in the attached drawings are schematically shown, and they are not always described strictly accurately in size or the like. Further, in the respective illustrations, identical or similar constitutional elements are given the same symbols. In the description of the embodiment made hereinafter, there may be a case where an expression added with the term "approximately" such as "approximately parallel", "approximately orthogonal" is used. For example, "approximately parallel" means not only "completely parallel" but also "substantially parallel", that is, means that "approximately parallel" also includes the difference of approximately several % from "completely parallel", for example. The same goes also for other expressions with "approximately".

Embodiment

The configuration of an energy storage device 100 according to an embodiment is described. FIG. 1 is a perspective view schematically showing an external appearance of the energy storage device 100 according to the embodiment. As shown in FIG. 1, the energy storage device 100 has a flat rectangular parallelepiped outer shape. The energy storage device 100 is a secondary battery which can charge electricity and discharge electricity. For example, the energy storage device 100 is a nonaqueous electrolyte secondary battery such as a lithium ion secondary battery. However, the energy storage device 100 is not limited to a nonaqueous electrolyte secondary battery, and may be a secondary battery other than a nonaqueous electrolyte secondary battery, or may be a primary battery where a user can use stored electricity without charging, or may be a capacitor.

Figure 2:
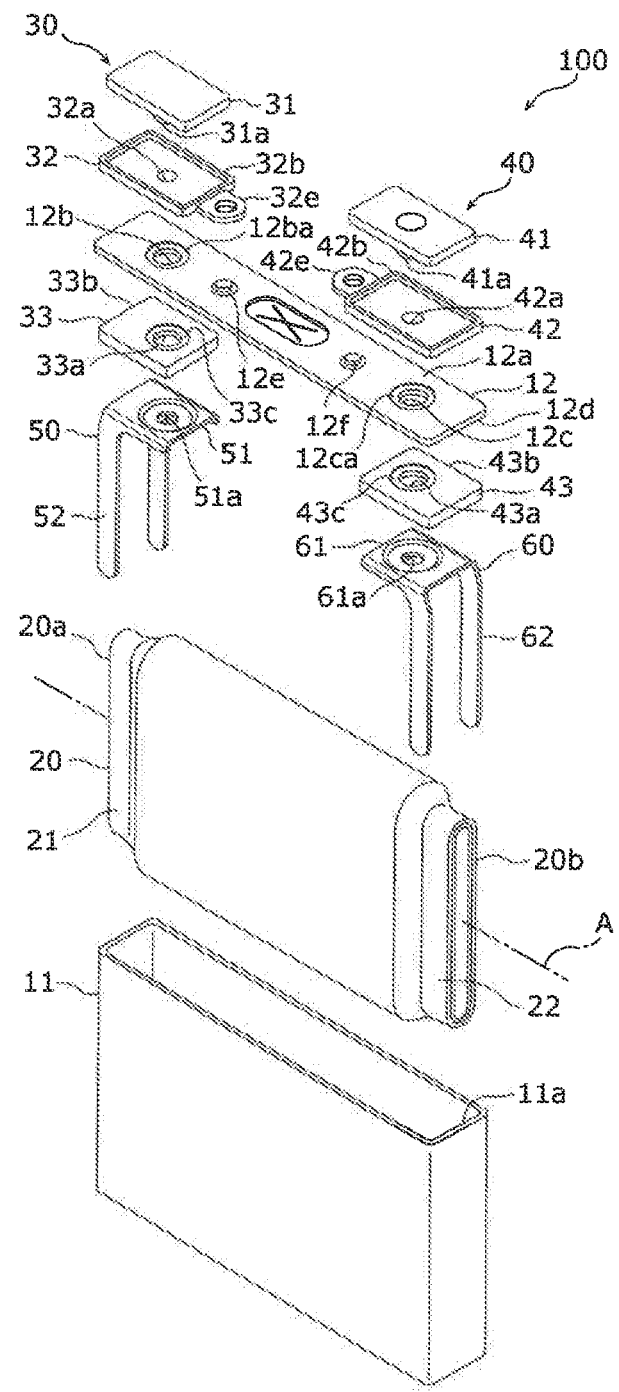
FIG. 2 is an exploded perspective view of the energy storage device shown in FIG. 1.

With reference to FIG. 1 and FIG. 2, the energy storage device 100 includes: a container 10 having a flat rectangular parallelepiped shape; an electrode assembly 20 which is accommodated in the container 10; and a positive electrode terminal 30 and a negative electrode terminal 40 which form electrode terminals. FIG. 2 is an exploded perspective view of the energy storage device 100 shown in FIG. 1. The container 10 has: a bottomed angular cylindrical container body 11; and an elongated rectangular plate-like lid body 12 capable of closing an elongated rectangular-shaped opening portion 11a of the container body 11. The container body 11 has a flat rectangular parallelepiped outer shape. The positive electrode terminal 30 and the negative electrode terminal 40 are disposed on an outer surface 12a of the lid body 12.

The container body 11 and the lid body 12 are fixed to each other using a joining method such as welding such that the joining portions of the respective members are joined to each other in a gas-tight manner. Although it is not limited, the container body 11 and the lid body 12 can be made of weldable metal such as stainless steel, aluminum, an aluminum alloy, for example.

Although an electrolyte such as an electrolyte solution (in this embodiment, a nonaqueous electrolyte solution) is sealed in the container 10, the illustration of such an electrolyte is omitted. As the electrolyte sealed in the container 10, a kind of the electrolyte is not particularly limited and various kinds of electrolyte can be selected provided that performance of the energy storage device 100 is not impaired.

The positive electrode terminal 30 and the negative electrode terminal 40 are respectively connected to a positive electrode current collector 50 and a negative electrode current collector 60 having conductivity on a side opposite to the outer surface 12a of the lid body 12. Further, the positive electrode current collector 50 and the negative electrode current collector 60 are connected to the electrode assembly 20. Accordingly, the electrode assembly 20 is mounted in a suspended manner from the lid body 12 by way of the positive electrode current collector 50 and the negative electrode current collector 60. The electrode assembly 20 is accommodated in the container body 11 together with the positive electrode current collector 50 and the negative electrode current collector 60. In this case, there may be a case where, to provide insulation between the electrode assembly 20 and the container body 11, the electrode assembly 20 is covered with an insulation film or the like. There may be also a case where a buffer member such as a spacer is disposed between the electrode assembly 20 and the container body 11.

The electrode assembly 20 is an energy storage element (also referred to as a power generating element) which can store electricity. The electrode assembly 20 includes: an elongated strip-shaped sheet-like positive electrode plate; an elongated strip-shaped sheet-like negative electrode plate; and an elongated strip-shaped sheet-like separator in a state where the positive electrode plate, the negative electrode plate, and the separator are stacked to each other in an overlapping manner. The electrode assembly 20 is formed by winding a stacked body formed of the positive electrode plate, the negative electrode plate, and the separator in a spiral shape about a winding axis A in a multilayered manner. The winding axis A is an imaginary axis indicated by a chain line in FIG. 2, the electrode assembly 20 has an approximately symmetrical shape with respect to the winding axis A. In the electrode assembly 20 which is formed by winding the stacked body formed of the positive electrode plate, the negative electrode plate, and the separator, the positive electrode plate, the negative electrode plate, and the separator are stacked in a multilayered manner in a direction perpendicular to the winding axis A in a state where the separator is interposed between the positive electrode plate and the negative electrode plate. Although the profile of the electrode assembly 20 is not limited, in this embodiment, the electrode assembly 20 has a flat profile where a cross section of the electrode assembly 20 perpendicular to the winding axis A is a flat elongated circular profile. However, the cross-sectional shape of the electrode assembly 20 may be a shape other than an elongated circular shape, and may be a circular shape, an elliptical shape, a rectangular shape, or other polygonal shapes.

The positive electrode plate includes: a positive electrode substrate; and a positive active material layer. The positive electrode substrate is an elongated strip-shaped metal foil made of metal such as aluminum or an aluminum alloy, and the positive active material layer is stacked to a surface of the positive electrode substrate using a method such as coating. The negative electrode plate includes: a negative electrode substrate; and a negative active material layer. The negative electrode substrate is made of an elongated strip-shaped metal foil made of metal such as copper or a copper alloy, and the negative active material layer is stacked on a surface of the negative electrode substrate using a method such as coating. The separator is a microporous sheet made of a material having electrical insulation property such as a resin. As a positive active material for forming the positive active material layer or a negative active material for forming the negative active material layer, a known material can be suitably used provided that a material capable of occluding and discharging lithium ions is used as the positive active material or the negative active material.

The electrode assembly 20 has two end portions 20a, 20b along a direction of the winding axis A. A positive active material non-forming portion 21 is formed on the end portion 20a, and a negative active material non-forming portion 22 is formed on the end portion 20b. The positive active material non-forming portion 21 is formed in a strip shape along an edge of the positive electrode plate along a circumferential direction of the electrode assembly 20 which is a winding direction. To be more specific, the positive active material non-forming portion 21 is an edge portion of the positive electrode substrate where the positive active material layer is not formed. The positive active material non-forming portion 21 is wound in a multilayered manner thus forming a state where the positive active material non-forming portion 21 is stacked in a multilayered manner in a direction perpendicular to the winding axis A. The negative active material non-forming portion 22 is also formed in a strip shape along an edge of the negative electrode plate along the circumferential direction of the electrode assembly 20. To be more specific, the negative active material non-forming portion 22 is an edge portion of the negative electrode substrate where the negative active material layer is not formed. The negative active material non-forming portion 22 is wound in a multilayered manner thus forming a state where the negative active material non-forming portion 22 is stacked in a multilayered manner in a direction perpendicular to the winding axis A.

Figure 3:
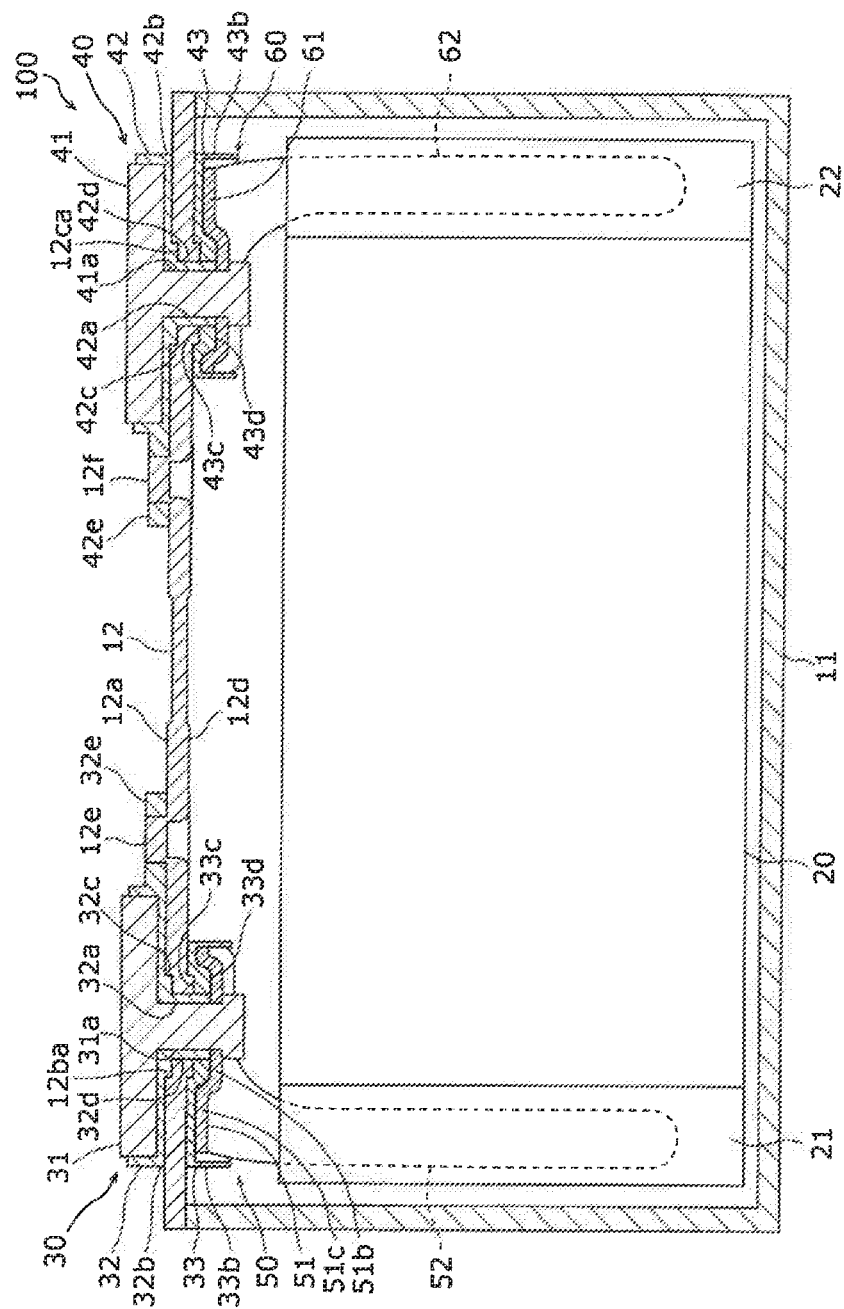
FIG. 3 is a cross-sectional side view of the energy storage device shown in FIG. 1, and is a view of a cross section of the energy storage device taken along a flat direction of a container body and passing the center of a lid body as viewed in a direction III.

With reference to FIG. 2 and FIG. 3, the positive electrode terminal 30 and the negative electrode terminal 40 and the configurations around the positive electrode terminal 30 and the negative electrode terminal 40 are described. FIG. 3 is a cross-sectional side view of the energy storage device 100 shown in FIG. 1, and shows a cross section of the energy storage device 100 along a flat direction of the container body 11 and passing the center of the lid body 12 as viewed from a direction III. Further, FIG. 3 is a side view of the electrode assembly 20. The positive electrode terminal 30 is an integral body formed of: a rectangular plate-like terminal body portion 31; and a circular cylindrical shaft portion 31a which protrudes from a wide flat surface of the terminal body portion 31. The negative electrode terminal 40 is an integral body formed of a rectangular plate-like terminal body portion 41; and a circular cylindrical shaft portion 41a which protrudes from a wide flat surface of the terminal body portion 41. The shaft portions 31a, 41a are respectively made to pass through holes 12b, 12c which are formed on the outer surface 12a of the lid body 12 in a penetrating manner, and are connected to the positive electrode current collector 50 and the negative electrode current collector 60 respectively.

The positive electrode current collector 50 and the negative electrode current collector 60 are disposed on a side opposite to the terminal body portions 31, 41 with the lid body 12 sandwiched therebetween. The positive electrode current collector 50 is a member having conductivity and rigidity, and is made of metal such as aluminum or an aluminum alloy in the same manner as the positive electrode substrate of the positive electrode plate of the electrode assembly 20. The negative electrode current collector 60 is a member having conductivity and rigidity, and is made of metal such as copper or a copper alloy in the same manner as the negative electrode substrate of the negative electrode plate of the electrode assembly 20. The positive electrode current collector 50 is an integral body formed of a plate-like first connecting portion 51 which is connected to the shaft portion 31a of the positive electrode terminal 30; and two elongated plate-like second connecting portions 52 which are connected to the positive active material non-forming portion 21 of the electrode assembly 20. The second connecting portions 52 extend continuously from the first connecting portion 51 in a protruding manner from the first connecting portion 51. The negative electrode current collector 60 is an integral body formed of: a plate-like first connecting portion 61 which is connected to the shaft portion 41a of the negative electrode terminal 40; and two elongated plate-like second connecting portions 62 which are connected to the negative active material non-forming portion 22 of the electrode assembly 20. The second connecting portions 62 extend continuously from the first connecting portion 61 in a protruding manner from the first connecting portion 61.

On the outer surface 12a of the lid body 12, an upper insulating member 32 is disposed between the terminal body portion 31 of the positive electrode terminal 30 and the lid body 12. An upper insulating member 42 is disposed between the terminal body portion 41 of the negative electrode terminal 40 and the lid body 12. On an inner surface 12d of the lid body 12 on a side opposite to the outer surface 12a, a lower insulating member 33 is disposed between the lid body 12 and the first connecting portion 51 of the positive electrode current collector 50. A lower insulating member 43 is disposed between the lid body 12 and the first connecting portion 61 of the negative electrode current collector 60. The upper insulating members 32, 42 and the lower insulating members 33, 43 are respectively formed of a plate-like gasket made of a resin material having electric insulation property, flexibility, and/or elasticity. A through hole 32a and a through hole 33a are formed in the upper insulating member 32 and the lower insulating member 33 respectively, and the shaft portion 31a of the positive electrode terminal 30 can pass through the through holes 32a, 33a. A through hole 42a and a through hole 43a are formed in the upper insulating member 42 and the lower insulating member 43 respectively, and the shaft portion 41a of the negative electrode terminal 40 can pass through the through holes 42a, 43a.

The shaft portion 31a of the positive electrode terminal 30 passes through the through hole 32a of the upper insulating member 32, the through hole 12b of the lid body 12, the through hole 33a of the lower insulating member 33, and a through hole 51a formed in the first connecting portion 51 of the positive electrode current collector 50 sequentially and, thereafter, a distal end of the shaft portion 31a is swaged. With such a configuration, the positive electrode terminal 30 and the positive electrode current collector 50 are joined to each other, and are mounted on and fixed to the lid body 12 in a state where the upper insulating member 32 and the lower insulating member 33 are interposed between the positive electrode terminal 30 and the positive electrode current collector 50. The joining using swaging is a joining using plastic deformation of the shaft portion 31a. In such joining, the distal end of the shaft portion 31a receives a pressing force so that the distal end is plastically deformed so as to increase a diameter thereof on the first connecting portion 51. Accordingly, the positive electrode terminal 30 is joined to the positive electrode current collector 50 in a state where the first connecting portion 51 and the like are sandwiched between the terminal body portion 31 and the plastically deformed portion of the shaft portion 31a. The plastically deformed portion of the distal end of the shaft portion 31a which forms a portion where the positive electrode terminal 30 and the positive electrode current collector 50 are joined to each other by swaging is positioned on a side opposite to the lid body 12 with respect to the first connecting portion 51, and is positioned inside the container 10. A joining method using such swaging is also referred to as inner swaging. When the plastically deformed portion of the shaft portion 31a is positioned outside the container 10, a joining method using such swaging is also referred to as outer swaging.

In the same manner, the shaft portion 41a of the negative electrode terminal 40 passes through the through hole 42a of the upper insulating member 42, the through hole 12c of the lid body 12, the through hole 43a of the lower insulating member 43, and a through hole 61a formed in the first connecting portion 61 of the negative electrode current collector 60 sequentially and, thereafter, a distal end of the shaft portion 41a is swaged in the same manner as the shaft portion 31a. With such a configuration, the negative electrode terminal 40 and the negative electrode current collector 60 are joined to each other, and are mounted on and fixed to the lid body 12 in a state where the upper insulating member 42 and the lower insulating member 43 are interposed between the negative electrode terminal 40 and the negative electrode current collector 60.

A connection structure between the positive electrode terminal 30 and the positive electrode current collector 50 and a connection structure between the negative electrode terminal 40 and the negative electrode current collector 60 are not limited to the above-mentioned swaging connection structure. As the connection structure, any connection structure may be adopted provided that the terminal body portion 31 or 41 and the positive electrode current collector 50 or the negative electrode current collector 60 are connected to each other in a state where the upper insulating member 32 or 42, the lid body 12, and the lower insulating member 33 or 43 are sandwiched between the terminal body portion 31 or 41 and the positive electrode current collector 50 or the negative electrode current collector 60. For example, a bolt and a nut may be used in place of the shaft portion 31a or 41a, and the shaft portion 31a or 41a may be welded to the positive electrode current collector 50 or the negative electrode current collector 60.

Two second connecting portions 52 of the positive electrode current collector 50 mounted on the lid body 12 are assembled to the positive active material non-forming portion 21 of the electrode assembly 20 so as to sandwich the positive active material non-forming portion 21 from both sides thus being connected to the positive active material non-forming portion 21. In the same manner, two second connecting portions 62 of the negative electrode current collector 60 mounted on the lid body 12 are assembled to the negative active material non-forming portion 22 of the electrode assembly 20 so as to sandwich the negative active material non-forming portion 22 from both sides thus being connected to the negative active material non-forming portion 22. For the above-mentioned connection, welding such as ultrasonic welding or resistance welding can be used. With such a configuration, the electrode assembly 20 is fixed to the lid body 20 in a state where the winding axis A is directed in a direction along the lid body 12. That is, the electrode assembly 20 forms a vertically winding-type electrode assembly. The positive electrode terminal 30 is physically and electrically connected to the positive electrode plate of the electrode assembly 20 by way of the positive electrode current collector 50. The negative electrode terminal 40 is physically and electrically connected to the negative electrode plate of the electrode assembly 20 by way of the negative electrode current collector 60.

The detailed configurations of the lid body 12, the positive electrode terminal 30, the negative electrode terminal 40, the upper insulating members 32, 42, the lower insulating members 33, 43, the positive electrode current collector 50 and the negative electrode current collector 60 are further described. With reference to FIG. 2 and FIG. 3, on the lid body 12, the through holes 12b, 12c are respectively formed at a center of a circular-shaped stepped portion 12ba and a center of a circular-shaped stepped portion 12ca formed on the lid body 12 respectively. The stepped portions 12ba, 12ca are respectively formed of a stepped portion indented in a circular cylindrical shape from the outer surface 12a of the lid body 12 and protruding in a circular cylindrical shape from the inner surface 12d of the lid body 12. For example, the stepped portions 12ba, 12ca can be formed by punching the lid body 12 from the outer surface 12a to the inner surface 12d using a circular columnar die to an extent that the die does not penetrate the lid body 12. That is, the stepped portions 12ba, 12ca can be formed by applying half blanking to the lid body 12.

The upper insulating member 32 is an integral body formed of a rectangular plate-like body portion 32b; a circular cylindrical engaging protruding portion 32c which protrudes from one surface out of two wide surfaces of the body portion 32b; a circular cylindrical cylinder portion 32d which protrudes from the engaging protruding portion 32c coaxially with the engaging protruding portion 32c; and a tab-shaped fixing portion 32e which protrudes outward from the body portion 32b. The through hole 32a extends through the body portion 32b, the engaging protruding portion 32c, and the cylinder portion 32d in a penetrating manner. The engaging protruding portion 32c has a shape and a size such that the whole engaging protruding portion 32c can be fitted in a recess of the stepped portion 12ba formed on the outer surface 12a of the lid body 12. The cylinder portion 32d has an outer diameter capable of passing through the through hole 12b of the lid body 12 and the through hole 33a of the lower insulating member 33. The fixing portion 32e prevents the rotation of the upper insulating member 32 about the cylinder portion 32d on the outer surface 12a by fitting a protrusion 12e integrally formed on the outer surface 12a of the lid body 12 into a through hole formed in the fixing portion 32e.

In the same manner, the upper insulating member 42 is an integral body formed of a rectangular plate-like body portion 42b; a circular cylindrical engaging protruding portion 42c which protrudes from one surface out of two wide surfaces of the body portion 42b; a circular cylindrical cylinder portion 42d which protrudes from the engaging protruding portion 42c coaxially with the engaging protruding portion 42c; and a tab-shaped fixing portion 42e which protrudes outward from the body portion 42b. The through hole 42a extends through the body portion 42b, the engaging protruding portion 42c, and the cylinder portion 42d in a penetrating manner. The engaging protruding portion 42c has a shape and a size such that the whole engaging protruding portion 42c can be fitted in a recess of the stepped portion 12ca formed on the outer surface 12a of the lid body 12 as a whole. The cylinder portion 42d has an outer diameter capable of passing through the through hole 12c of the lid body 12 and the through hole 43a of the lower insulating member 43. The fixing portion 42e prevents the rotation of the upper insulating member 42 about the cylinder portion 42d on the outer surface 12a by fitting a protrusion 12f integrally formed on the outer surface 12a of the lid body 12 into a through hole formed in the fixing portion 42e.

The lower insulating member 33 is an integral body formed of a rectangular plate-like body portion 33b; a circular cylindrical engaging recessed portion 33c which is indented from one surface out of two wide surfaces of the body portion 33b; and a frustoconical protruding portion 33d which protrudes from the other wide surface of the body portion 33b. The through hole 33a is positioned such that an axis of the through hole 33a agrees with the center axis of the engaging recessed portion 33c and the protruding portion 33d, and extends through the body portion 33b and the protruding portion 33d in a penetrating manner. The engaging recessed portion 33c has a shape and a size with which the whole protruding portion of the stepped portion 12ba of the lid body 12 on the inner surface 12d can be fitted in the engaging recessed portion 33c.

In the same manner, the lower insulating member 43 is an integral body formed of: a rectangular plate-like body portion 43b; a circular cylindrical engaging recessed portion 43c which is indented from one surface out of two wide flat surfaces of the body portion 43b; and a frustoconical protruding portion 43d which protrudes from the other wide surface of the body portion 43b. The through hole 43a is positioned such that an axis of the through hole 43a agrees with the center axis of the engaging recessed portion 43c and the protruding portion 43d, and extends through the body portion 43b and the protruding portion 43d in a penetrating manner. The engaging recessed portion 43c has a shape and a size with which the whole protruding portion of the stepped portion 12ca of the lid body 12 on the inner surface 12d can be fitted in the engaging recessed portion 43c.

Figure 4:
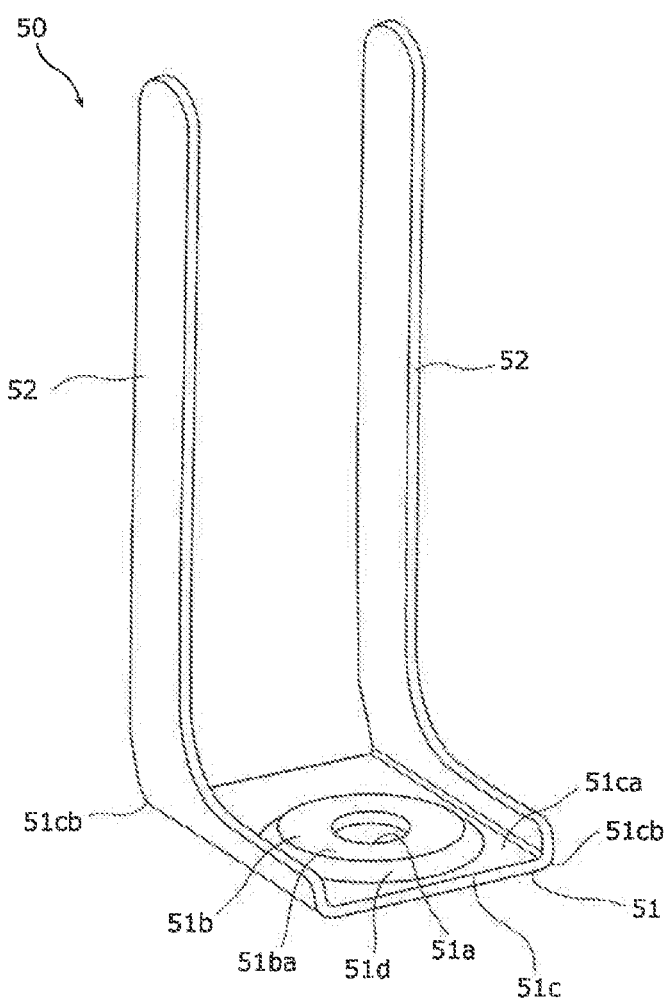
FIG. 4 is a perspective view of a positive electrode current collector shown in FIG. 2 as viewed from a different direction in an enlarged manner.

With reference to FIG. 2 to FIG. 4, the detailed configuration of the positive electrode current collector 50 is further described. FIG. 4 is a perspective view of the positive electrode current collector 50 of the energy storage device 100 shown in FIG. 2 as viewed in a direction from the second connecting portion 52 toward the first connecting portion 51. The negative electrode current collector 60 has substantially the same configuration as the positive electrode current collector 50 and hence, the description of a detailed configuration of the negative electrode current collector 60 is omitted.

The positive electrode current collector 50 is an integral body formed of one first connecting portion 51 and two second connecting portions 52. The first connecting portion 51 and the second connecting portions 52 are formed of one continuous member. For example, the positive electrode current collector 50 may be formed by applying working such as bending or pressing to one plate member, or may be formed of one continuous member by casting, forging, cutting or the like. The first connecting portion 51 is an integral body formed of one flat rectangular plate-like base portion 51c; one flat annular plate-like attachment portion 51b which protrudes from the base portion 51c; and one annular-shaped connecting portion 51d which connects the attachment portion 51b and the base portion 51c to each other. The respective second connecting portions 52 are elongated plate-like portions continuously extending from two opposite side portions 51cb of the base portion 51c of the positive electrode current collector 50. Each second connecting portion 52 has a straight-line elongated plate-like shape extending from an end portion thereof positioned remote from the base portion 51c to an area in the vicinity of the base portion 51c. Further, each second connecting portion 52 has a tapered plate-like shape whose width is gradually increased in a direction along the side portion 51cb of the base portion 51c as the second connecting portion 52 extends from an area in the vicinity of the base portion 51c toward an end portion positioned close to the base portion 51c, that is, toward the side portion 51cb of the base portion 51c. The above-mentioned direction from the end portion at the remote position to the end portion at the close position of the second connecting portion 52 is also a direction extending from the positive electrode current collector 50 toward the lid body 12 and the positive electrode terminal 30, and the direction opposite to the above-mentioned direction is a direction away from the lid body 12 and the positive electrode terminal 30.

The flat annular plate-like attachment portion 51b forms an annular flat attachment surface 51ba. The attachment surface 51ba is a surface which faces the protruding direction of the second connecting portion 52 out of two wide flat surfaces of the attachment portion 51b. That is, the attachment surface 51ba is a surface positioned on a side opposite to the lid body 12 and the positive electrode terminal 30. The through hole 51a which penetrates the attachment portion 51b is formed at the center of the attachment surface 51ba. The attachment portion 51b and the attachment surface 51ba extend substantially parallel to the surface 51ca of the base portion 51c. The surface 51ca is a surface facing in the protruding direction of the second connecting portion 52 out of two wide flat surfaces of the base portion 51c. The respective second connecting portions 52 extend substantially perpendicular to the attachment surface 51ba and the surface 51ca.

The connecting portion 51d has an annular shape continuously extending from the surface 51ca of the base portion 51c to the attachment portion 51b. The connecting portion 51d is a portion formed by bending a constitutional member of the positive electrode current collector 50 in a direction from the base portion 51c toward the attachment portion 51b and, thereafter, by bending the constitutional member in a direction along the attachment surface 51ba. The attachment portion 51b and the connecting portion 51d protruding from the surface 51ca of the base portion 51c form a frustoconical stereoscopic structure. The whole periphery of the attachment portion 51b is supported by the connecting portion 51d. The attachment portion 51b and the connecting portion 51d form a frustoconical recessed portion on an inner side. The protruding portion 33d of the lower insulating member 33 has a shape and a size such that the protruding portion 33d can be fitted in the above-mentioned frustoconical recessed portion.

Accordingly, when the positive electrode current collector 50 is viewed in a direction from the attachment surface 51ba toward the base portion 51c, the attachment portion 51b protrudes in a protruding direction of the second connecting portion 52 from the base portion 51c from the base portion 51c. That is, the attachment portion 51b is disposed at a position shifted from the base portion 51c. In the above-mentioned positive electrode current collector 50, the frustoconical stereoscopic structure formed of the attachment portion 51b and the connecting portion 51d is formed, and the above-mentioned stereoscopic structure is formed on a bent portion of the constitutional member of the positive electrode current collector 50. For example, the attachment portion 51b and the connecting portion 51d may be realized by applying working such as pressing to a flat rectangular plate-like portion which forms the base portion 51c, or may be realized by casting, forging, cutting of the member or the like.

When the positive electrode current collector 50 is assembled to the lower insulating member 33 in mounting the positive electrode current collector 50 on the lid body 12, the protruding portion 33d of the lower insulating member 33 is fitted in the recessed portion formed by the attachment portion 51b and the connecting portion 51d of the positive electrode current collector 50 and is brought into contact with the attachment portion 51b, and the body portion 33b around the protruding portion 33d of the lower insulating member 33 is brought into contact with the base portion 51c of the positive electrode current collector 50. In such a state, in the positive electrode current collector 50, the attachment portion 51b protrudes toward a side opposite to the terminal body portion 31 of the positive electrode terminal 30 and the lid body 12 with respect to the base portion 51c from the base portion 51c.

In mounting the positive electrode current collector 50 on the lid body 12, the shaft portion 31a of the positive electrode terminal 30 which passes through the through hole 51a of the attachment portion 51b and protrudes from the attachment surface 51ba is swaged. Then, the distal end of the shaft portion 31a which protrudes from the attachment surface 51ba is collapsed and expanded toward the attachment surface 51ba by a swaging die so that the attachment portion 51b is fixed to the lower insulating member 33, that is, to the lid body 12. When the shaft portion 31a is collapsed, the swaging die presses the attachment portion 51b together with the shaft portion 31a to be collapsed so that the terminal body portion 31 of the positive electrode terminal 30, the upper insulating member 32, and the lid body 12 are brought into close contact with each other, and the lid body 12, the lower insulating member 33, and the attachment portion 51b are brought into close contact with each other. A pressing force generated by swaging applied to the attachment portion 51b is received by the attachment portion 51b and the base portion 51c. The attachment portion 51b is configured to have a stereoscopic structure protruding in a direction opposite to a direction in which the attachment portion 51b receives a pressing force generated by swaging, and the connecting portion 51d having the above-mentioned stereoscopic structure exhibits resistance against bending of the attachment portion 51b. Accordingly, deformation of the attachment portion 51b due to a pressing force generated by swaging can be largely suppressed by the first connecting portion 51 which is supported by the lower insulating member 33 having flexibility and/or elasticity. Further, the annular connecting portion 51d continuously extending from the base portion 51c with bending of the constitutional member increases bending rigidity of the base portion 51c and can suppress also deformation of the base portion 51c. In the same manner as the positive electrode current collector 50, also the negative electrode current collector 60 has a stereoscopic structure formed of an attachment portion and a connecting portion of the negative electrode current collector 60 thus acquiring substantially the same manner of operation as the above-mentioned manner of operation of the positive electrode current collector 50.

As described above, the energy storage device 100 according to this embodiment includes: the positive electrode terminal 30 and the negative electrode terminal 40; the electrode assembly 20; and the positive electrode current collector 50 and the negative electrode current collector 60 which connect the positive electrode terminal 30 and the negative electrode terminal 40 to the electrode assembly 20. The positive electrode current collector 50 has: the first connecting portion 51 connected to the positive electrode terminal 30; and the second connecting portions 52 connected to the electrode assembly 20 and the first connecting portion 51. The first connecting portion 51 has: the base portion 51c connected to the second connecting portions 62; and the attachment portion 51b formed in a protruding manner in a direction opposite to a direction toward the positive electrode terminal 30 from the base portion 51c. The through hole 51a in which the shaft portion 31a of the positive electrode terminal 30 is inserted is formed in the attachment portion 51b.

In the above-mentioned configuration, for example, in the first connecting portion 51 of the positive electrode current collector 50, the attachment portion 51b forms the stereoscopic structure protruding in a direction opposite to a direction toward the positive electrode terminal 30 with respect to the base portion 51c. Such an attachment portion 51b has higher rigidity and strength compared to a case where the attachment portion 51b is simply formed of a flat plate member. Further, the attachment portion 51b suppresses deformation of the base portion 51c which may occur when the attachment portion 51b receives a force at the time of connecting the positive electrode current collector 50 to the positive electrode terminal 30. Accordingly, even when the attachment portion 51b receives a force at the time of connecting the positive electrode current collector 50 to the positive electrode terminal 30, the deformation which may occur in the first connecting portion 51 is suppressed. For example, as described in the above-mentioned embodiment, when the shaft portion 31a of the positive electrode terminal 30 and the positive electrode current collector 50 are joined to each other by inner swaging, the shaft portion 31a and the attachment portion 51b of the positive electrode current collector 50 around the shaft portion 31a are pressed toward the lid body 12 by a swaging joining die. The attachment portion 51b protrudes from the base portion 51c in a direction opposite to a direction toward the positive electrode terminal 30, that is, in a direction opposite to a direction of a pressing force. Such an attachment portion 51b has high rigidity and high strength against a pressing force compared to a case where the attachment portion 51b is configured to extend flatly from the base portion 51c or is configured to protrude toward the positive electrode terminal 30 from the base portion 51c. Accordingly, the deformation of the attachment portion 51b can be suppressed. The negative electrode current collector 60 having substantially the same configuration as the positive electrode current collector 50 can acquire substantially the same advantageous effects as the positive electrode current collector 60.

In the energy storage device 100 according to this embodiment, the attachment portion 51b of the first connecting portion 51 of the positive electrode current collector 50 is formed in an annularly protruding manner from the base portion 51c. In the above-mentioned configuration, for example, in the positive electrode current collector 50, rigidity of the attachment portion 51b and rigidity of the portion around the attachment portion 51b which form the annular stereoscopic structure are largely increased. The negative electrode current collector 60 having substantially the same configuration as the positive electrode current collector 50 can also acquire substantially the same advantageous effect.

In the energy storage device 100 according to this embodiment, the attachment portion 51b of the first connecting portion 51 of the positive electrode current collector 50 forms the attachment surface 51ba where the through hole 51a is positioned. With such a configuration, for example, connection of the shaft portion 31a of the positive electrode terminal 30 at the attachment portion 51b can be facilitated. The negative electrode current collector 60 having substantially the same configuration as the positive electrode current collector 50 also acquires substantially the same advantageous effect.

In the energy storage device 100 according to this embodiment, the positive electrode current collector 50 is formed by applying working to one plate member. With such a configuration, for example, the positive electrode current collector 50 can be formed of a continuous plate member. Accordingly, the structure of the positive electrode current collector 50 can be simplified, and strength of the positive electrode current collector 50 can be increased. The negative electrode current collector 60 having substantially the same configuration as the positive electrode current collector 50 can acquire substantially the same advantageous effect.

[Modification 1]

As a modification 1 of the energy storage device 100 according to the embodiment, a following configuration can be exemplified. In an energy storage device according to the modification 1, the configurations of a positive electrode current collector and a negative electrode current collector differ from the configurations of the positive electrode current collector 50 and the negative electrode current collector 60 of the energy storage device 100 according to the embodiment. The positive electrode current collector and the negative electrode current collector of the energy storage device according to the modification 1 have substantially the same configuration and hence, only the configuration of the positive electrode current collector is described. In the description of the following modifications, constitutional elements given the same symbols as the reference symbols used in the above-referenced drawings are identical or similar to the above-mentioned constitutional elements and hence, the detailed description of the constitutional elements is omitted.

Figure 5:
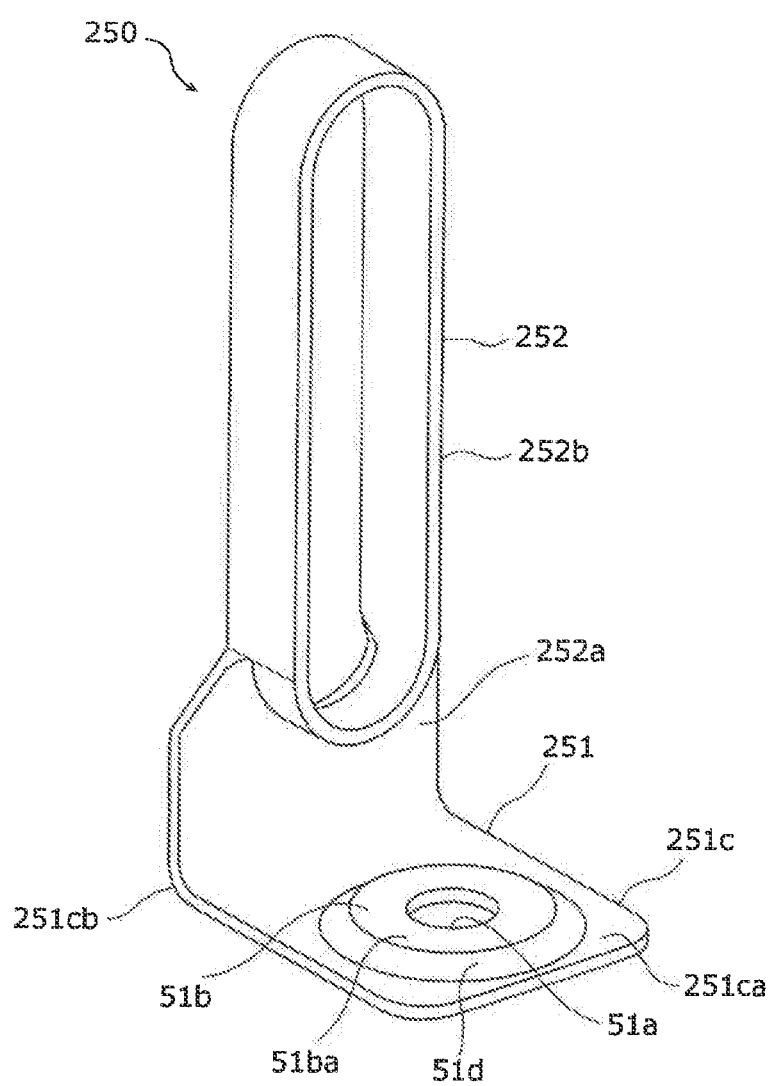
FIG. 5 is a perspective view showing a positive electrode current collector in a modification 1 of the energy storage device according to the embodiment in the same manner as FIG. 4.

With reference to FIG. 5, a positive electrode current collector 250 of the energy storage device according to the modification 1 is an integral body formed of one first connecting portion 251 and one second connecting portion 252 extending respectively in directions substantially perpendicular to each other. FIG. 5 is a perspective view showing the positive electrode current collector 250 in the modification 1 of the energy storage device according to the embodiment in the same manner as FIG. 4. The first connecting portion 251 is formed of: an integral body formed of one rectangular plate-like base portion 251c; one annular plate-like attachment portion 51b which protrudes from one surface 251ca out of two wide surfaces of the base portion 251c; and one annular connecting portion 51d which connects the attachment portion 51b and the base portion 251c to each other. The attachment portion 51b and the connecting portion 51d of the positive electrode current collector 250 are integrally formed on the base portion 251c in the same manner as the attachment portion 51b and the connecting portion 51d of the positive electrode current collector 50 of the energy storage device 100 according to the embodiment. A through hole 51a is formed in the attachment surface 51ba of the attachment portion 51b.

The second connecting portion 252 is integrally formed of: a flat plate-like support portion 252a; and a ring-shaped joint portion 252b. The support portion 252a is connected to one side portion 251cb of the base portion 251c of the first connecting portion 251, and extends substantially perpendicular to the base portion 251c. The support portion 252a and the base portion 251c form an approximately right-angled bent portion. The joint portion 252b forms an elongated circular-shaped ring. A positive active material non-forming portion 21 of an electrode assembly 20 can be inserted into the ring of the joint portion 252b, and the inserted positive active material non-forming portion 21 can be joined with the joint portion 252b. The joint portion 252b extends from an end portion of the support portion 252a on a side opposite to the base portion 251c in a state where a longitudinal direction of an elongated circle is directed in a direction substantially perpendicular to the base portion 251c. The joint portion 252b protrudes substantially in the same direction as the protruding direction of the attachment portion 251b with respect to a surface 251ca of the base portion 251c.

Figure 6:
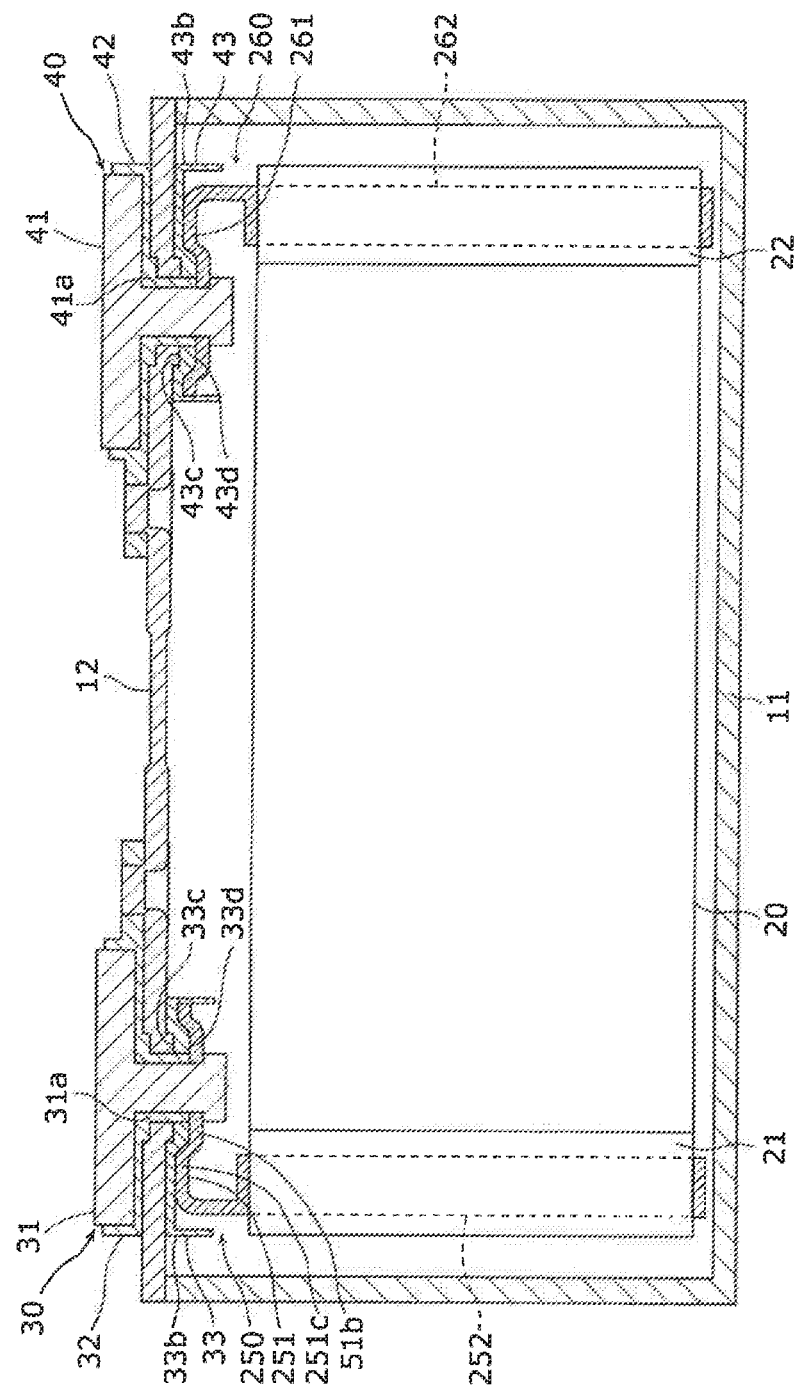
FIG. 6 is a cross-sectional side view showing an energy storage device according to the modification 1 in the same manner as FIG. 3.

With reference to FIG. 5 and FIG. 6, when the positive electrode current collector 250 is mounted on a lid body 12, a frustoconical protruding portion 33d of the lower insulating member 33 is fitted in a recessed portion formed by the attachment portion 51b and the connecting portion 51d of the positive electrode current collector 250 and is brought into contact with the attachment portion 51b. Further, the body portion 33b around the protruding portion 33d of the lower insulating member 33 is brought into contact with the base portion 251c of the positive electrode current collector 250. FIG. 6 is a view similar to FIG. 3 showing a cross section as viewed from a side of the energy storage device according to the modification 1. The negative electrode current collector 260 of the energy storage device according to the modification 1 also has a first connecting portion 261 and a second connecting portion 262 similar to the first connecting portion 251 and the second connecting portion 252 of the positive electrode current collector 250. Other configurations and the manner of operation of the energy storage device according to the modification 1 are substantially equal to those of the energy storage device 100 according to the embodiment and hence, their description is omitted.

Figure 7:
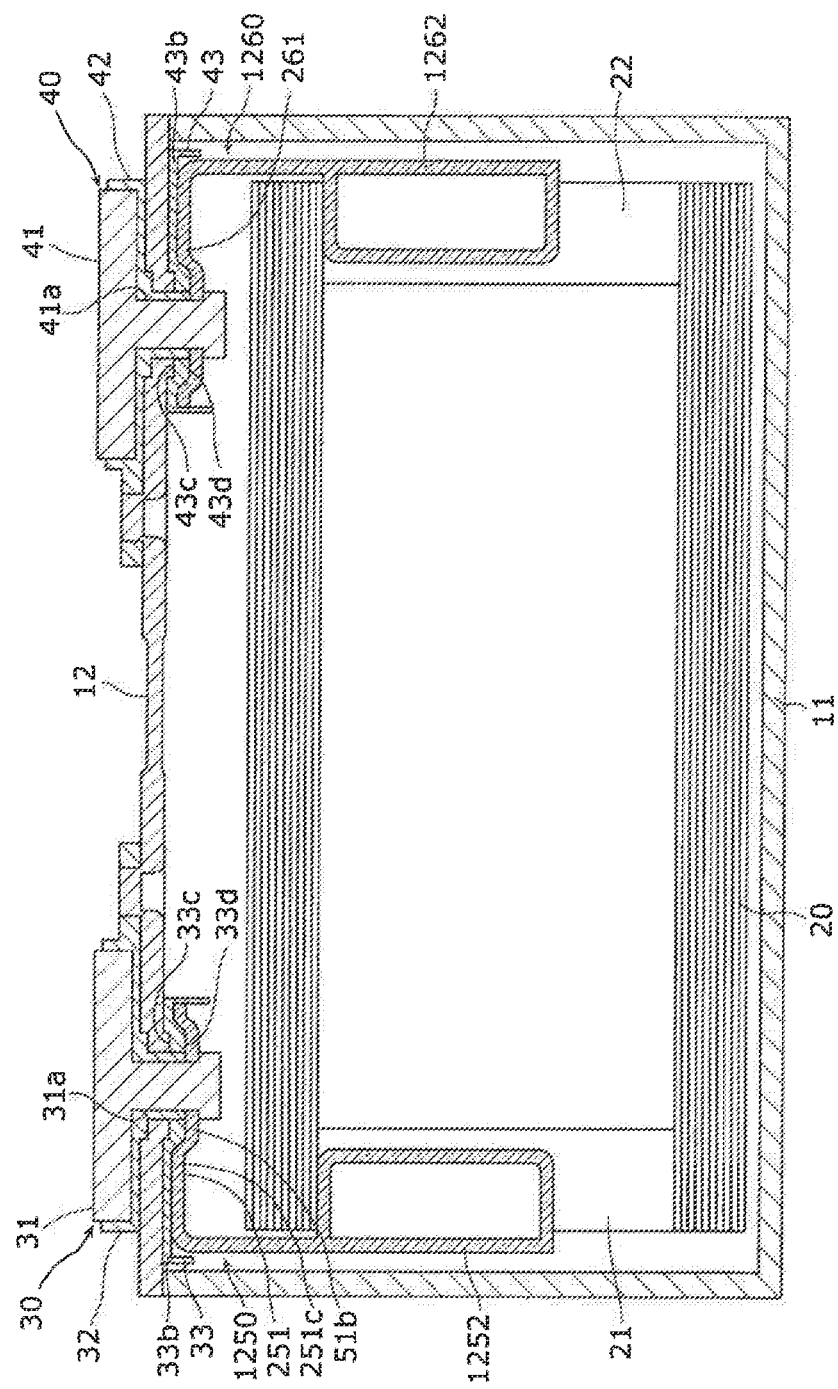
FIG. 7 is a view showing a cross-sectional side view in another modification of the energy storage device according to the modification 1 in the same manner as FIG. 3.

In the energy storage device according to the modification 1, the ring-shaped joint portion 252b of the second connecting portion 252 of the positive electrode current collector 250 is configured such that the positive active material non-forming portion 21 of the electrode assembly 20 can be inserted into the ring-shaped joint portion 252b. However, as shown in FIG. 7, a joint portion of a second connecting portion 1252 of a positive electrode current collector 1250 may be configured to be insertable into a space defined in a positive electrode plate, a negative electrode plate, and a separator of the electrode assembly 20 which are wound in a spiral shape. FIG. 7 is a view similar to FIG. 3 showing a cross section as viewed from a side of another modification of the energy storage device according to the modification 1. FIG. 7 shows a cross section of the electrode assembly 20 as viewed from a side.

The second connecting portion 1252 of the positive electrode current collector 1250 has substantially the same configuration as the second connecting portion 252 of the positive electrode current collector 250. A joint portion of the second connecting portion 1252 also has an elongated circular ring shape in the same manner as the joint portion 252b of the second connecting portion 252. Opening portions on both sides of the ring of the joint portion of the second connecting portion 1252 are closed by two plate members which form the second connecting portion 1252. The above-mentioned two plate members may not be provided. The joint portion of the second connecting portion 1252 is formed with a size and a shape such that the joint portion can be accommodated in a space defined in the positive electrode plate, the negative electrode plate, and the separator of the electrode assembly 20. The joint portion of the second connecting portion 1252 may have a size and a shape which extend over the whole space of the electrode assembly 20, or may have a size and a shape which extend over a portion of the space. The joint portion of the second connecting portion 1252 is inserted into the electrode assembly 20, and is joined to the positive active material non-forming portion 21. In this modification, a negative electrode current collector 1260 and a second connecting portion 1262 of the negative electrode current collector 1260 also have substantially the same configurations as the positive electrode current collector 1250 and the second connecting portion 1252.

[Modification 2]

As a modification 2 of the energy storage device 100 according to the embodiment, the following configuration is exemplified. In an energy storage device according to the modification 2, the configurations of a first connecting portion of a positive electrode current collector and a first connecting portion of a negative electrode current collector differ from those of the positive electrode current collector 50 and the negative electrode current collector 60 of the energy storage device 100 according to the embodiment. The positive electrode current collector and the negative electrode current collector of the energy storage device according to the modification 2 have substantially the same configuration and hence, only the configuration of the positive electrode current collector is described.

Figure 8:
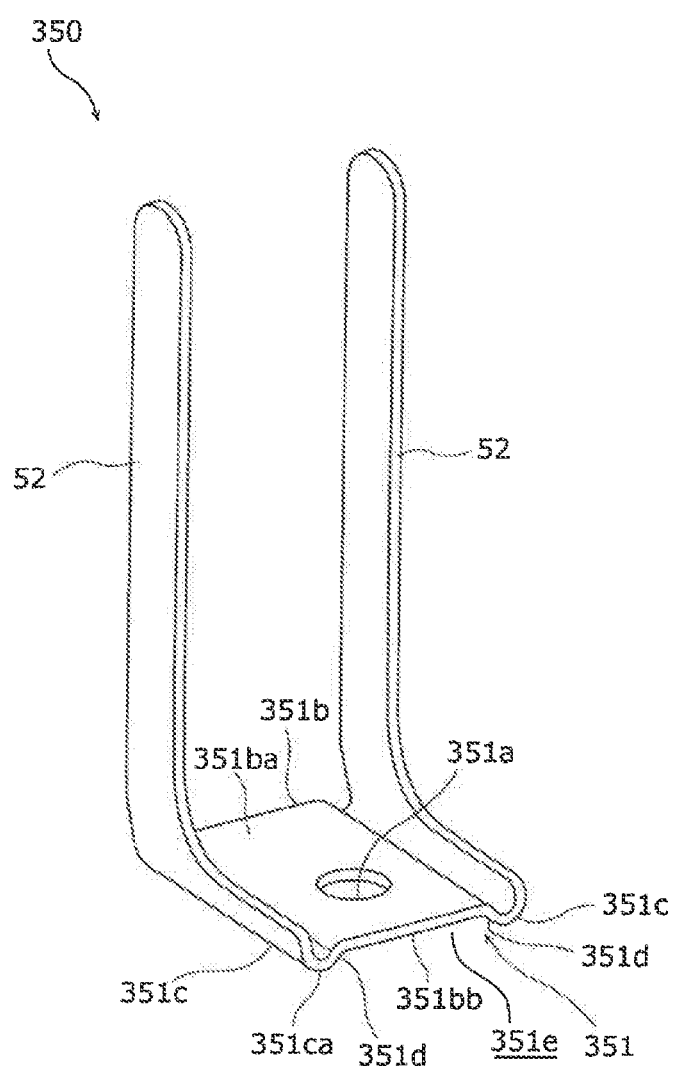
FIG. 8 is a perspective view showing a positive electrode current collector in a modification 2 of the energy storage device according to the embodiment in the same manner as FIG. 4.

With reference to FIG. 8, a positive electrode current collector 350 of the energy storage device according to the modification 2 is an integral body formed of one first connecting portion 351 and two second connecting portions 52 by integral molding. FIG. 8 is a perspective view showing the positive electrode current collector in the modification 2 of the energy storage device according to the embodiment in the same manner as FIG. 4. The first connecting portion 351 and the second connecting portions 52 are formed of one continuous member. The first connecting portion 351 has: one rectangular plate-like attachment portion 351b; two base portions 351c which are respectively connected to the second connecting portions 52; and two connecting portions 351d which connect the attachment portion 351b and the base portions 351c to each other. The respective second connecting portions 52 extend from the respective base portions 351c. Each second connecting portion 52 has a straight-line elongated plate-like shape from an end portion thereof remote from each base portion 351c to an area in the vicinity of each base portion 351c, and has a tapered plate-like shape whose width is gradually increased in a direction from an area in the vicinity of each base portion 351c toward each base portion 351c.

Each base portion 351c is a portion continuously formed with each second connecting portion 52 and extending from an end portion in the vicinity of each second connecting portion 52. Further, each base portion 351c is a portion which is formed by folding a constitutional member of the positive electrode current collector 350 extending in a direction from an end portion remote from the second connecting portion 52 toward the end portion close to the second connecting portion 52 in a direction opposite to the above-mentioned direction while being curved. Such a base portion 351c forms a folded portion of a plate member which forms the positive electrode current collector 350. Each base portion 351c has a J-shaped groove shape in cross section which extends in a straight line shape along a direction in which a width of each second connecting portion 52 is increased in a tapered manner.

The flat-plate-like attachment portion 351b forms a flat rectangular-shaped attachment surface 351ba thereon. The attachment surface 351ba is a surface facing in a protruding direction of the second connecting portion 52 out of two wide flat surfaces of the attachment portion 351b. That is, the attachment surface 351ba is a surface positioned on a side opposite to a lid body 12 and a positive electrode terminal 30. In the attachment surface 351ba, a through hole 351a which penetrates the attachment portion 351b is formed. The attachment portion 351b and the attachment surface 351ba extend substantially parallel to edges 351ca of two base portions 351c. Further, each second connecting portion 52 extends substantially perpendicular to the attachment surface 351ba. The edge 351ca of each base portion 351c is a portion corresponding to a bottom portion of the base portion 351c having a J-shaped groove shape, and is a protruding end of the base portion 351c. The edge 351ca extends straight line shape along an extending direction of a groove of the base portion 351c.

Two connecting portions 351d connect two side portions of the rectangular plate-like attachment portion 351b positioned opposite to each other to two base portions 351c extending along the above-mentioned side portions respectively. Each connecting portion 351d extends along the side portion and each base portion 351c, and continuously extends from each base portion 351c to the attachment portion 851b. Each connecting portion 351d is a portion formed by bending a constitutional member of the positive electrode current collector 50 folded at each base portion 351c in a direction along the attachment surface 351ba.

Accordingly, when the positive electrode current collector 350 is viewed from an attachment surface 351ba side, the attachment portion 351b protrudes from the base portions 351c toward a protruding direction of the second connecting portions 52 from the base portions 351c. That is, the attachment portion 351b is formed at a position shifted from the base portions 351c. On the other hand, when the positive electrode current collector 350 is viewed from a side opposite to the attachment surface 351ba, each base portion 351c forms a straight-line strip-shaped protrusion which protrudes from the attachment portion 351b.

In the above-mentioned positive electrode current collector 350, a trapezoidal stereoscopic structure is formed by the base portions 351c, the connecting portions 351d and the attachment portion 351b, and the above-mentioned stereoscopic structure is formed by the bent portion of the constitutional member of the positive electrode current collector 50. On the other hand, in the positive electrode current collector 50, on an attachment back surface 351bb of the attachment portion 351b on a side opposite to the attachment surface 351ba, a trapezoidal recessed portion 351e formed of the base portions 351c, the connecting portions 351d, and the attachment portion 351b is formed.

Figure 9:
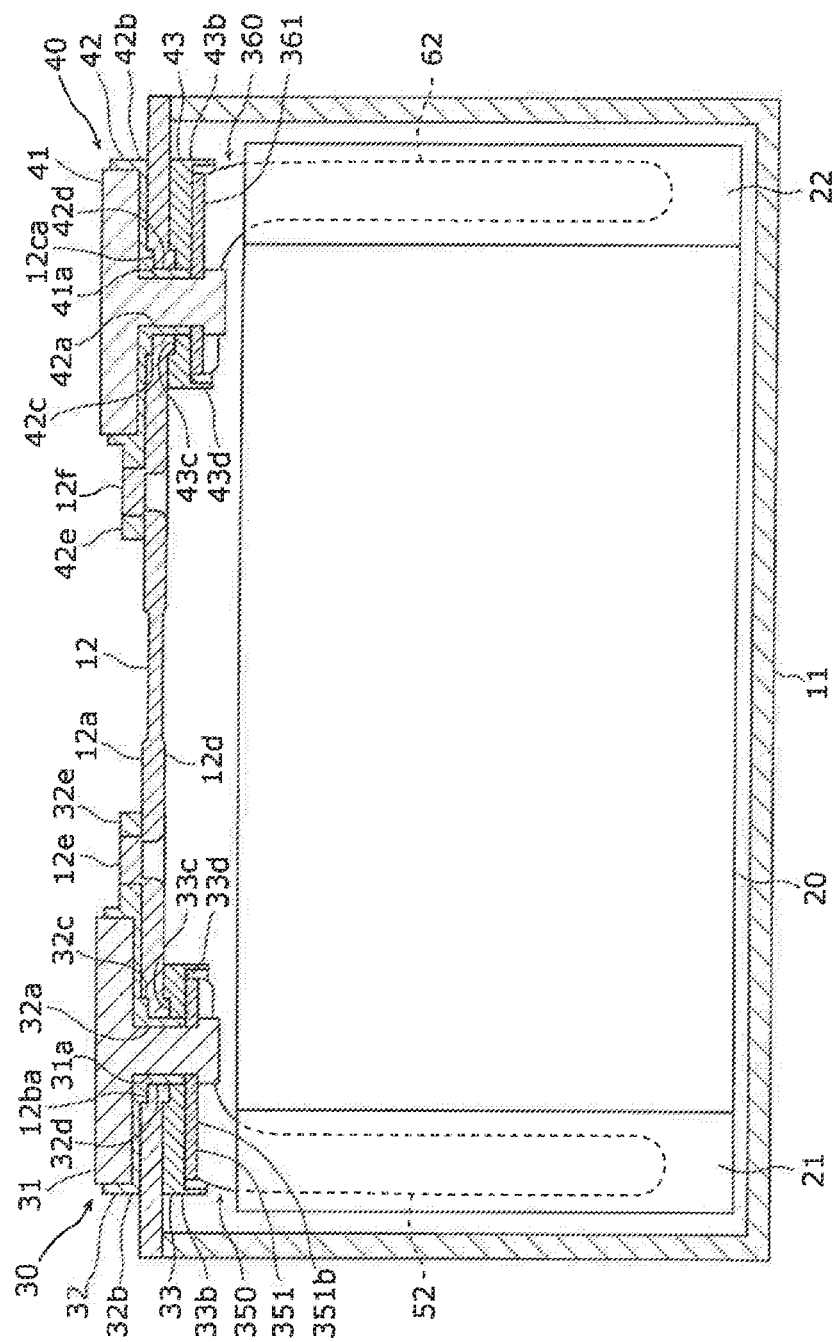
FIG. 9 is a view showing a cross-sectional side view of an energy storage device according to the modification 2 in the same manner as FIG. 3.

With reference to FIG. 8 and FIG. 9, in the lower insulating member 33, the protruding portion 33d forms a flat rectangular parallelepiped protruding portion which protrudes from a wide surface of the body portion 33b. Further, the body portion 33b protrudes from both edges of the protruding portion 33d in a lateral direction substantially perpendicular to a longitudinal direction of the lid body 12 directed from the positive electrode terminal 30 toward the negative electrode terminal 40. In the same manner, also in the lower insulating member 43, the protruding portion 43d forms a flat rectangular parallelepiped protruding portion which protrudes from a wide surface of the body portion 43b. Further, the body portion 43b protrudes from both edges of the protruding portion 43d in the lateral direction of the lid body 12.

When the positive electrode current collector 350 is assembled to the lower insulating member 33 in mounting the positive electrode current collector 350 on the lid body 12, the protruding portion 33d of the lower insulating member 33 is fitted in the recessed portion 351e of the positive electrode current collector 350, and is brought into contact with the attachment portion 351b of the positive electrode current collector 350. Two base portions 351c of the positive electrode current collector 350 are formed on the body portion 33b which protrudes sideward from both sides of the protruding portion 33d of the lower insulating member 33 and is positioned in a retracted manner from the protruding portion 33d. Further, in mounting the positive electrode current collector 350 on the lid body 12, the shaft portion 31a of the positive electrode terminal 30 which passes through the through hole 351a of the attachment portion 351b and protrudes from the attachment surface 351ba is swaged. In swaging the shaft portion 31a, the attachment portion 351b is pressed together with the shaft portion 31a by a swaging die. A pressing force applied to the attachment portion 351b is received by the attachment portion 351b and the base portions 351c. The attachment portion 351b is configured to have the stereoscopic structure protruding in a direction opposite to a direction in which the attachment portion 351b receives a pressing force generated by swaging, and the base portions 351c and the connecting portions 351d having the above-mentioned stereoscopic structure become a bending resistance of the attachment portion 351b. Accordingly, in the first connecting portion 351 which is supported on the lower insulating member 33 having flexibility and/or elasticity, deformation of the attachment portion 351b due to a pressing force generated by swaging can be largely suppressed. Further, in the same manner as the positive electrode current collector 350, the first connecting portion 361 of the negative electrode current collector 360 also forms the stereoscopic structure which is formed of base portions, connecting portions and attachment portion. Accordingly, the negative electrode current collector 360 also can acquire advantageous effects substantially equal to the above-mentioned advantageous effects of the positive electrode current collector 350.

Other configurations and the manner of operation of the energy storage device according to the modification 2 are substantially equal to those of the energy storage device 100 according to the embodiment and hence, their description is omitted. The energy storage device according to the modification 2 can acquire substantially the same advantageous effects as the energy storage device 100 according to the embodiment. In the energy storage device according to the modification 2, the base portions 351c of the first connecting portion 351 of the positive electrode current collector 350 form folded portions of a plate member which forms the positive electrode current collector 350. In the above-mentioned configuration, the base portions 351c form the folded portions of the member and hence, the base portion 351c has high rigidity. Also with respect to the negative electrode current collector 360 having substantially the same configuration as the positive electrode current collector 350, substantially the same advantageous effects can be acquired.

In the energy storage device according to the modification 2, the base portion 351c of the first connecting portion 351 of the positive electrode current collector 350 is formed on both sides of the attachment portion 351b. In the above-mentioned configuration, for example, in the first connecting portion 351, in the case where the base portion 351c has high rigidity, the stereoscopic structure formed of two base portions 351c having high rigidity and the attachment portion 351b has high rigidity. With such a configuration, a region of the attachment portion 351b can be expanded so that a diameter of the shaft portion 31a of the positive electrode terminal 30 and a diameter of the swaged end portion of the shaft portion 31a can be increased. Accordingly, an allowable electric current of the positive electrode terminal 30 and a joining strength by swaging can be increased. Also with respect to the negative electrode current collector 360 having substantially the same configuration as the positive electrode current collector 350 can acquire substantially the same advantageous effects.

[Modification 3]

Figure 10:
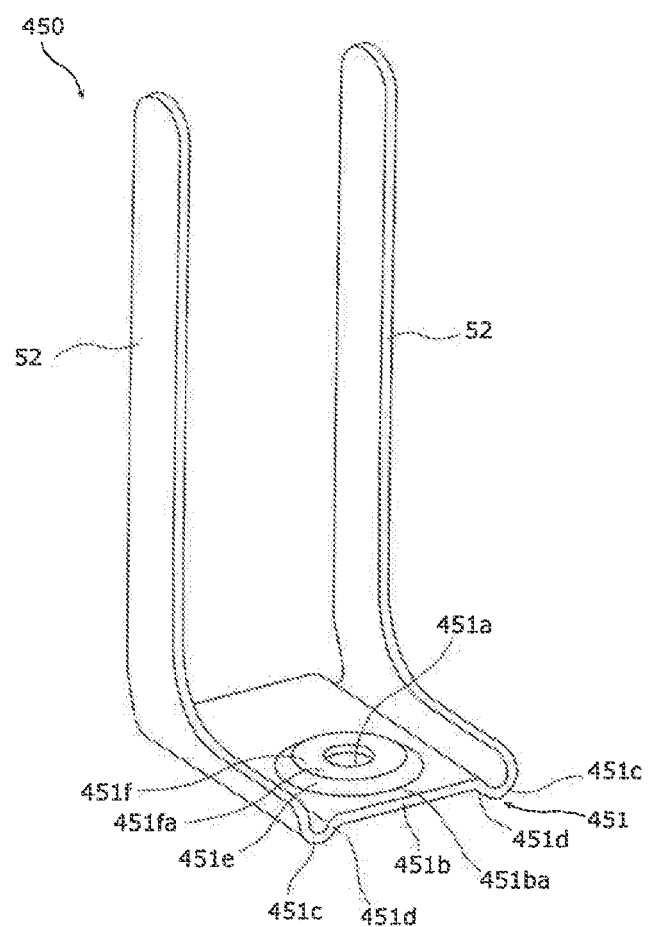
FIG. 10 is a perspective view showing a positive electrode current collector in a modification 3 of the energy storage device according to the embodiment in the same manner as FIG. 4.

As a modification 3 of the energy storage device 100 according to the embodiment, the following configuration can be exemplified. FIG. 10 is a perspective view showing a positive electrode current collector 450 according to the modification 3 of the energy storage device of the embodiment in the same manner as FIG. 4. As shown in FIG. 10, a positive electrode current collector and a negative electrode current collector of an energy storage device according to the modification 3 respectively have the configurations which are obtained by combining the configurations of the first connecting portions of the positive electrode current collector 50 and the negative electrode current collector 60 of the energy storage device 100 according to the embodiment and the configurations of the first connecting portions of the positive electrode current collector 350 and the negative electrode current collector 360 of the energy storage device according to the modification 2. The positive electrode current collector and the negative electrode current collector of the energy storage device according to the modification 3 have substantially the same configuration and hence, only the configuration of the positive electrode current collector is described.

To be more specific, a positive electrode current collector 450 of the energy storage device according to the modification 3 has the configuration where the attachment portion 51b and the connecting portion 51d of the positive electrode current collector 50 of the energy storage device 100 according to the embodiment are formed on the surface 351ba of the attachment portion 351b of the positive electrode current collector 350 of the energy storage device according to the modification 2.

The positive electrode current collector 450 has one first connecting portion 451, and two second connecting portions 52 having substantially the same configuration as the second connecting portion 52 of the positive electrode current collector 350 of the energy storage device according to the modification 2. The first connecting portion 451 is an integral body formed of two first base portions 451c, two first connecting portions 451d, and one second base portion 451b respectively having substantially the same configurations as the base portions 351c, the connecting portions 351d and the attachment portion 351b of the first connecting portion 351 of the positive electrode current collector 350. Further, the first connecting portion 451 is configured such that one second connecting portion 451e and one attachment portion 451f respectively having substantially the same configurations as the connecting portion 51d and the attachment portion 51b of the positive electrode current collector 50 of the energy storage device 100 according to the embodiment are integrally formed on a wide flat surface 451ba of the second base portion 451b. A through hole 451a is formed at the center of an attachment surface 451fa of an annular plate-like attachment portion 451f. The second connecting portion 451e and the attachment portion 451f protrude from the surface 451ba in a direction substantially equal to the protruding direction of the first base portion 451c and the second connecting portion 52.

The first base portions 451c, the first connecting portions 451d and the second base portion 451b form a trapezoidal stereoscopic structure, and a trapezoidal recessed portion is formed in the inside of the stereoscopic structure. The second connecting portion 451e and the attachment portion 451f form a frustoconical stereoscopic structure, and a frustoconical recessed portion is formed in the inside of the stereoscopic structure. The first connecting portion 451 has a two-stage stereoscopic structure where a frustoconical base is positioned above a trapezoidal base. The first base portion 451c forms a folded portion of a plate member which forms the positive electrode current collector 450.

Figure 11:
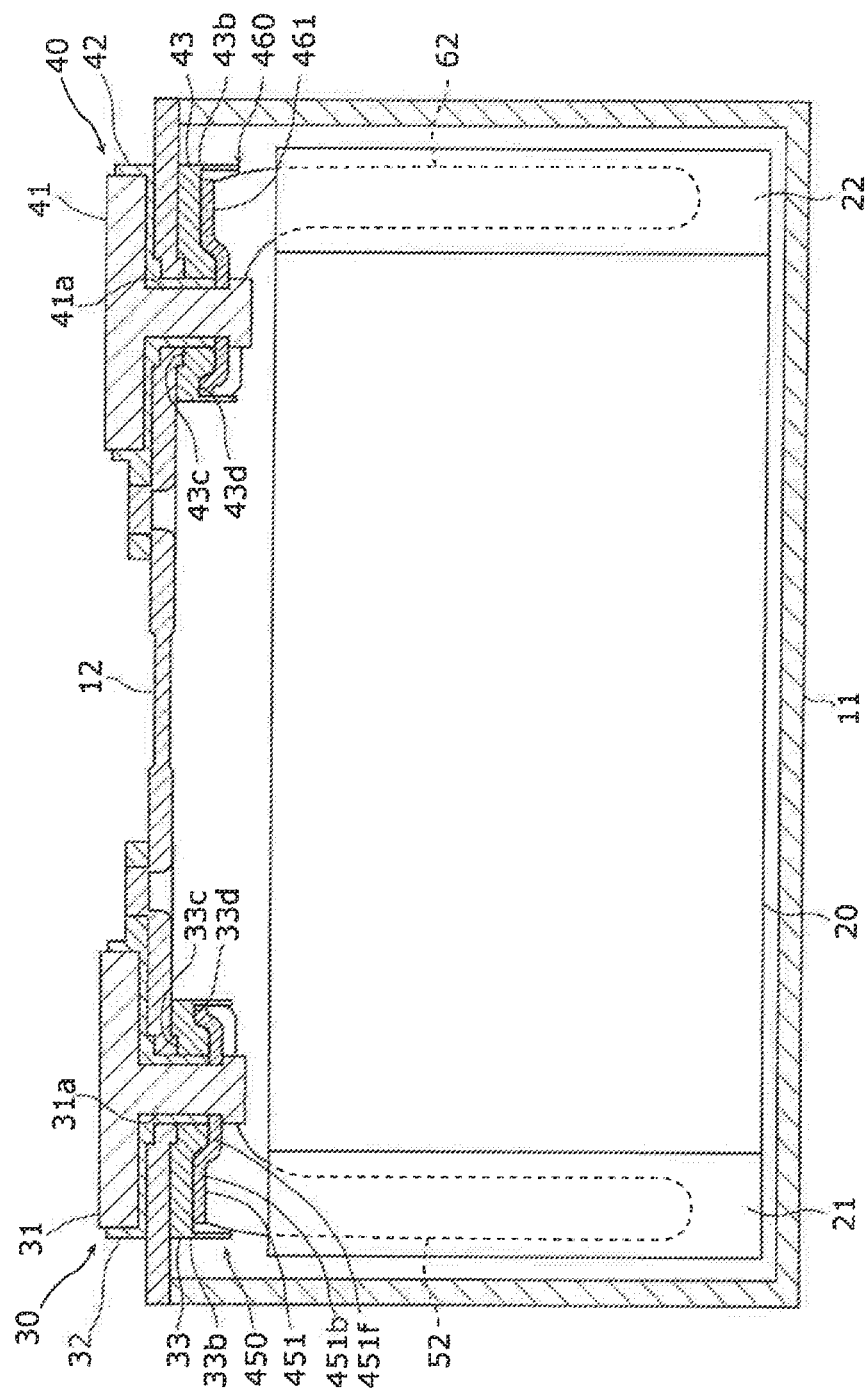
FIG. 11 is a view showing a cross-sectional side view of an energy storage device according to the modification 3 in the same manner as FIG. 3.

With reference to FIG. 10 and FIG. 11, a protruding portion 33d of a lower insulating member 33 is configured to be fitted in the two-stage shaped recessed portion formed by the first base portions 451c, the first connecting portions 451d, the second base portion 451b, the second connecting portion 451e, and the attachment portion 451f. FIG. 11 is a view showing a cross section as viewed from a side of the energy storage device according to the modification 3 in the same manner as FIG. 3. When the positive electrode current collector 450 is mounted on the lid body 12, the protruding portion 33d of the lower insulating member 33 is fitted in the two-stage-shaped recessed portion, and is brought into contact with the attachment portion 451f. Two first base portions 451c are formed on the body portion 33b which protrudes sideward from both sides of the protruding portion 33d of the lower insulating member 33 and is positioned in a retracted manner from the protruding portion 33d.

A pressing force applied to the attachment portion 451f at the time of swaging the shaft portion 31a of the positive electrode terminal 30 is received by the attachment portion 451f, the second base portion 451b and the first base portions 451c. The first base portions 451c, the first connecting portions 451d, and the second connecting portion 451e become a bending resistance thus largely suppressing deformation of the attachment portion 451f and the second base portion 451b which may occur due to a pressing force. Further, the negative electrode current collector 460 of the energy storage device according to the modification 3 also has a first connecting portion 461 having substantially the same stereoscopic structure as the first connecting portion 451 of the positive electrode current collector 450 and hence, the negative electrode current collector 460 also can acquire the manner of operation substantially equal to the above-mentioned manner of operation of the positive electrode current collector 450.

Other configurations and the manner of operation of the energy storage device according to the modification 3 are substantially equal to those of the energy storage device according to the embodiment or the modification 2 and hence, their description is omitted. The energy storage device according to the modification 3 can acquire substantially the same advantageous effects as the energy storage device according to the embodiment and the modification 2.

[Modification 4]

As a modification 4 of the energy storage device 100 according to the embodiment, the following configuration can be exemplified. In an energy storage device according to the modification 4, protruding directions of attachment portions of first connecting portions of a positive electrode current collector and a negative electrode current collector are opposite to those of the positive electrode current collector 50 and the negative electrode current collector 60 of the energy storage device 100 according to the embodiment. The positive electrode current collector and the negative electrode current collector of the energy storage device according to the modification 4 have substantially the same configuration and hence, only the configuration of the positive electrode current collector is described.

Figure 12:
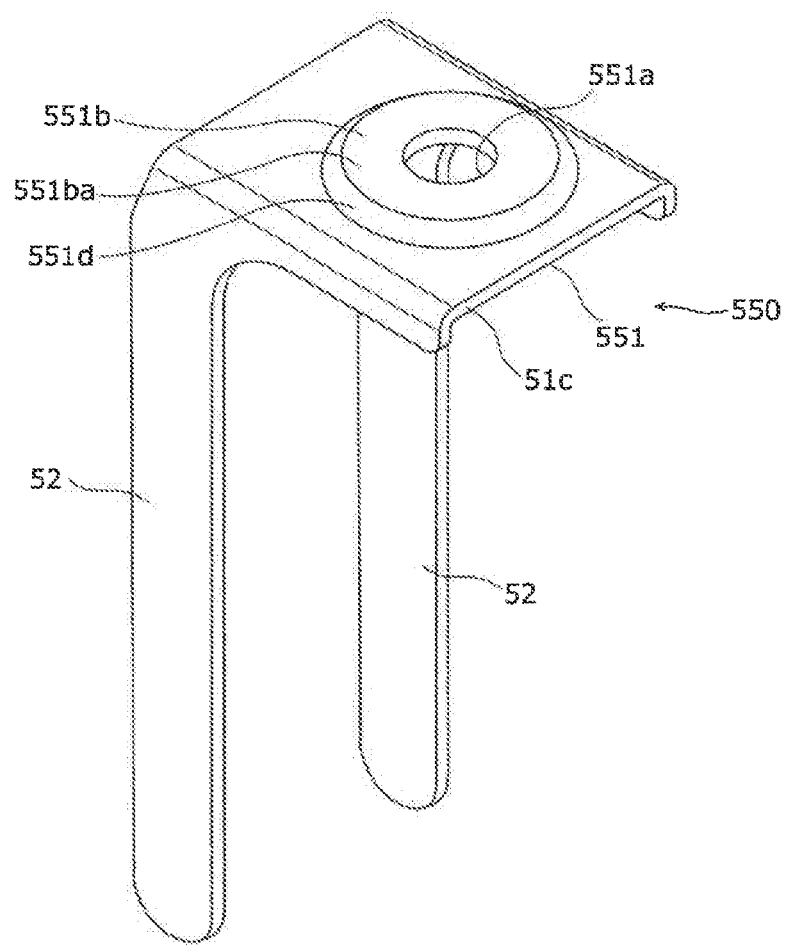
FIG. 12 is a perspective view showing a positive electrode current collector in a modification 4 of the energy storage device according to the embodiment as viewed in a direction different from a direction in FIG. 4.

With reference to FIG. 12, a positive electrode current collector 550 of the energy storage device according to the modification 4 has a first connecting portion 551 and second connecting portions 52. The first connecting portion 551 and the second connecting portions 52 of the positive electrode current collector 550 respectively have substantially the same configurations as the first connecting portion 51 and the second connecting portions 52 of the positive electrode current collector 50 of the energy storage device 100 according to the embodiment except for the configuration of an attachment portion 551b and the configuration of a connecting portion 551d of the first connecting portion 551. FIG. 12 is a perspective view showing the positive electrode current collector 550 in the modification 4 of the energy storage device 100 according to the embodiment as viewed in a direction different from FIG. 4.

To be more specific, the first connecting portion 551 of the positive electrode current collector 550 is an integral body formed of a rectangular flat plate-like base portion 51c, an annular plate-like attachment portion 551b which protrudes from the base portion 51c in a direction opposite to the second connecting portion 52, and an annular connecting portion 551d which connects the attachment portion 551b and the base portion 51c to each other. A through hole 551a which penetrates the attachment portion 551b is formed in a flat attachment surface 551ba of the attachment portion 551b.

Figure 13:
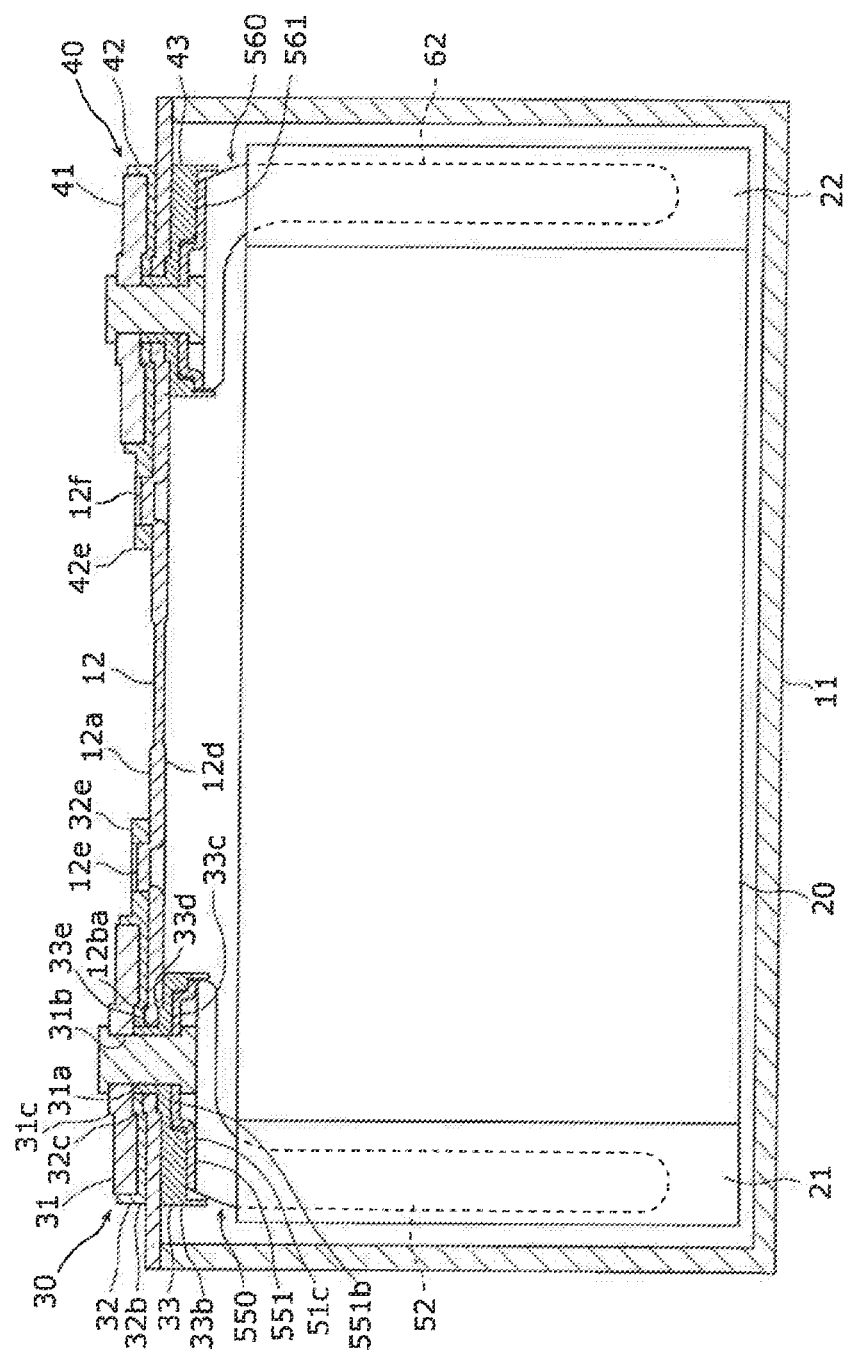
FIG. 13 is a view showing a cross-sectional side view of an energy storage device according to the modification 4 in the same manner as FIG. 3.

With reference to FIG. 12 and FIG. 13, around a positive electrode terminal 30 of the energy storage device according to the modification 4, a stepped portion 12ba of the lid body 12 which is formed by half blanking or the like is indented from an inner surface 12d of the lid body 12 in a circular cylindrical shape, and protrudes from an outer surface 12a of the lid body 12 in a circular cylindrical shape. The stepped portion 12ba is configured to be fitted in a circular cylindrical recessed portion formed on an upper insulating member 32. FIG. 13 is a view showing a cross-sectional side view of the energy storage device according to the modification 4 in the same manner as FIG. 3.

A circular cylindrical engaging protruding portion 32c of an upper insulating member 32 is configured to protrude toward a terminal body portion 31 of the positive electrode terminal 30 and to be fitted in a recessed portion of a circular-shaped stepped portion 31c of the terminal body portion 31 which is formed by half blanking or the like. The upper insulating member 32 does not have a sleeve portion.

A body portion 33b of a lower insulating member 33 has: a circular cylindrical protruding portion 33d which protrudes toward the lid body 12; a frustoconical-shaped engaging recessed portion 33c which is indented on a positive electrode current collector 550 side; and a cylindrical portion 33e which extends from the protruding portion 33d and passes through a through hole 12b of the lid body 12 and a through hole 32a of the upper insulating member 32. The protruding portion 33d is configured to be fitted in the recessed portion of the stepped portion 12ba of the lid body 12. The engaging recessed portion 33c is configured such that the attachment portion 551b and the connecting portion 551d of the positive electrode current collector 550 are fitted in the engaging recessed portion 33c.

In the positive electrode terminal 30, the terminal body portion 31 and a shaft portion 31a are provided as separate parts. The shaft portion 31a is disposed so as to pass through a through hole 551a of an attachment portion 551b of a first connecting portion 551, a through hole 33a of the lower insulating member 33, a through hole 12b of a lid body 12, a through hole 32a of the upper insulating member 32, and a through hole 31b formed in a stepped portion 31c of the terminal body portion 31 in a direction from the first connecting portion 551 of a positive electrode current collector 550 toward the terminal body portion 31. An end portion of the shaft portion 31a protruding from the terminal body portion 31 is swaged. At this stage of operation, in the positive electrode current collector 550, an attachment portion 551b protrudes from a base portion 51c toward a terminal body portion 31 side of the positive electrode terminal 30 and a lid body 12 side with respect to the base portion 51c. Accordingly, a pressing force generated by swaging is applied to the first connecting portion 551 of the positive electrode current collector 550 in a direction opposite to a protruding direction of the attachment portion 551b. The above-mentioned connecting portion 551d forming the stereoscopic structure of the attachment portion 551b becomes a bending resistance of the attachment portion 551b and hence, the connecting portion 551d can largely suppress the deformation of the attachment portion 551b due to a pressing force generated by swaging. The negative electrode current collector 560 also has a first connecting portion 561 having substantially the same configuration as the first connecting portion 551 of the positive electrode current collector 550 and hence, the negative electrode current collector 560 can acquire the manner of operation substantially equal to the above-mentioned manner of operation of the positive electrode current collector 550.

Other configurations and the manner of operation of the energy storage device according to the modification 4 are substantially equal to those of the energy storage device 100 according to the embodiment and hence, their description is omitted. The energy storage device according to the modification 4 can acquire substantially the same advantageous effects as the energy storage device 100 according to the embodiment.

[Other Modifications]

Although the energy storage devices according to the embodiment of the present invention and the modifications have been described heretofore, the present invention is not limited to the above-mentioned embodiment and the modifications. That is, it should be construed that the embodiment and the modifications disclosed in this specification are only for an exemplifying purpose in all aspects and are not limited. The scope of the present invention is not designated by the above-mentioned description but is designated by Claims, and it is intended that all changes which fall within the meaning and the scope equivalent to Claims are also included in the scope of the present invention.

In the energy storage devices according to the embodiment and the modifications, the electrode assembly 20 is a winding-type electrode assembly which is formed by winding a stacked positive electrode plate, a negative electrode plate and a separator. However, the electrode assembly 20 is not limited to the winding-type electrode assembly. The electrode assembly may be a stacking-type electrode assembly which is formed by stacking a large number of positive electrode plates, a large number of negative electrode plates, and a large number of separators, and may be a Z-type electrode assembly which is formed by bending one set, two or more sets of stacked plates, each consisting of a positive electrode plate, a negative electrode plate and a separator plural times.

In the energy storage devices according to the embodiment and the modifications, the second connecting portions of the positive electrode current collector or the negative electrode current collector are configured to extend from the first connecting portion in a one or two leg shape. However, the present invention is not limited to such a configuration. The second connecting portion may have any configuration, and the configuration of the second connecting portion can be arbitrarily changed in conformity with the configuration of an electrode assembly to which the second connecting portion is connected.

In the energy storage devices according to the embodiment and the modifications, the first connecting portion of the positive electrode current collector and the first connection portion of the negative electrode current collector respectively have the attachment portion having a rectangular-shaped or a circular-shaped attachment surface. However, the present invention is not limited to such a configuration. The attachment surface of the attachment portion may take any shapes, and may be formed into an elliptical shape, an elongated circular shape, other polygonal shape or the like.

In the energy storage devices according to the embodiment and the modifications, the first connecting portion of the positive electrode current collector and the first connecting portion of the negative electrode current collector respectively have the straight-line-groove-shaped portion or the rectangular plate-like base portion. However, the base portion is not limited to such shapes, and the base portion may have any shape. For example, a linear shape of a groove-shaped base portion may not be straight-line shape, and may be a linear shape which includes a curve, a polygonal line and the like. A planar shape of the plate-like base portion may not be a rectangular shape, and the planar shape may be an elliptical shape, an elongated circular shape or another polygonal shape. Further, the plate-like base portion may not be flat and may include bending. For example, the plate-like base portion may be bent in a convex shape in a protruding direction of the attachment portion. The groove-shaped base portion may not have a folded shape with curved portions and may have a folded shape with bent portions.

The energy storage devices according to the embodiment and the modifications respectively have one electrode assembly. However, the energy storage device may have two or more electrode assemblies.

In the energy storage devices according to the embodiment and the modifications, the electrode assembly 20 is configured such that the positive electrode current collector and the negative electrode current collector are connected at the positive active material non-forming portion 21 and the negative active material non-forming portion 22 respectively. The present invention is not limited to such a configuration. The electrode assembly may be configured such that a positive electrode current collecting tab group which is formed of positive electrode current collecting tabs protruding from the positive electrode substrate and a negative electrode current collecting tab group which is formed of negative electrode current collecting tabs protruding from the negative electrode substrate are disposed on two end portions of the electrode assembly respectively. Alternatively, the positive electrode current collecting tab group and the negative electrode current collecting tab group may be disposed on one end portion of the electrode assembly. In the above-mentioned configurations, the positive electrode current collecting tab group and the negative electrode current collecting tab group are respectively connected to the positive electrode current collector and the negative electrode current collector.

The energy storage devices according to the embodiment and the modifications are configured to include the vertically-winding-type electrode assembly 20. However, the energy storage device may be configured to include a transversely-winding-type electrode assembly where the electrode assembly 20 is disposed in a state where an end portion of the electrode assembly 20 in a winding axis A direction opposedly faces the lid body 12 of the container 10.

The energy storage devices according to the present invention exemplified in the embodiment and the modifications of the embodiment can be used as a relatively large-sized secondary battery. A discharge capacity of such a relatively-large-sized secondary battery is preferably set to 3 ampere-hour (Ah) or more, more preferably set to 10 Ah or more, further more preferably set to 20 Ah or more, and still further more preferably set to 30 Ah or more. Such an energy storage device is applicable to a power source for a vehicle such as an electric vehicle (EV), a hybrid electric vehicle (HEV), a plug-in hybrid electric vehicle (PHEV) or the like, a power source for power storage application such as an uninterruptible power system for backup or a solar power generating system.

Further, modes obtained by arbitrarily combining the embodiment and the modifications are also included in the scope of the present invention. The present invention can be realized not only in the form of the above-mentioned energy storage device, but can also be realized in the form of an energy storage apparatus including one or more energy storage devices. For example, the energy storage apparatus may be configured to include a plurality of energy storage units arranged in a row, and each energy storage unit includes a plurality of energy storage devices 100 arranged in a row. Due to the above-mentioned configuration, the energy storage apparatus can realize a high output. Further, the plurality of energy storage devices 100 are used as one unit, and the number of energy storage units and arrangements of the energy storage units can be selected corresponding to an electric capacity necessary for the energy storage apparatus, a shape, a size or the like of the energy storage apparatus.

INDUSTRIAL APPLICABILITY

The present invention is applicable to an energy storage device such as a lithium ion secondary battery and the like.

DESCRIPTION OF REFERENCE SIGNS

20: electrode assembly
30: positive electrode terminal (electrode terminal)
31a, 41a: shaft portion
40: negative electrode terminal (electrode terminal)
50, 250, 350, 450, 550, 1250: positive electrode current collector
51, 61, 251, 261, 351, 361, 451, 461, 551, 561: first connecting portion
51a, 61a, 251a, 351a, 451a, 551a: through hole
51b, 351b, 451f, 551b: attachment portion
51ba, 351ba, 451fa, 551ba: attachment surface
51c, 251c: base portion 52, 62, 252, 262, 1252, 1262: second connecting portion
60, 260, 360, 460, 560, 1260: negative electrode current collector
100: energy storage device
351c, 451c: base portion (folded portion)

The invention claimed is:

1. An energy storage device, comprising:
an electrode terminal;
an electrode assembly; and
a current collector which connects the electrode terminal and the electrode assembly,
wherein the current collector includes:
a first connecting portion which is connected with the electrode terminal; and
a second connecting portion which is connected with the electrode assembly and the first connecting portion,
wherein the first connecting portion includes:
a base portion which is connected to the second connecting portion; and
an attachment portion which is provided to protrude from the base portion in a direction which is opposite to a direction toward the electrode terminal,
wherein, in the attachment portion, a through hole through which a shaft portion of the electrode terminal is inserted is formed, and
wherein the first connecting portion further includes a recessed portion which is provided to recess from the base portion in the direction which is opposite to the direction toward the electrode terminal.

2. The energy storage device according to claim 1, wherein the attachment portion is provided to annularly protrude from the base portion.

3. The energy storage device according to claim 1, wherein the base portion includes a folded portion of a plate material, the plate material forming the current collector.

4. The energy storage device according to claim 1, wherein the base portion is provided at first and second sides of the attachment portion.

5. The energy storage device according to claim 1, wherein the attachment portion forms an attachment surface in which the through hole is positioned.

6. The energy storage device according to claim 1, wherein the current collector is formed by applying working to a plate material.

7. The energy storage device according to claim 1, wherein the recessed portion and the attachment portion are disposed on opposing sides of the base portion.

8. The energy storage device according to claim 1, wherein the attachment portion protrudes from a surface of the base portion that faces the second connecting portion.

9. The energy storage device according to claim 8, wherein the recessed portion is recessed from another surface of the base portion that faces the electrode terminal.

10. The energy storage device according to claim 1, wherein the attachment portion includes:
a first surface that faces the second connecting portion; and
a second surface that faces the electrode terminal and is disposed in the recessed portion.

11. The energy storage device according to claim 10, wherein the recessed portion extends from a surface of the base portion that faces the electrode terminal to the second surface of the attachment portion.

12. The energy storage device according to claim 1, wherein the first connecting portion further includes a connecting surface that connects the base portion to the attachment portion, and
wherein the attachment portion and the connecting surface protrude from a surface of the base portion that faces the second connecting portion to form a frustoconical structure.

13. The energy storage device according to claim 12, wherein the attachment portion and the connecting surface define the recessed portion in another surface of the base portion that faces the electrode terminal to form a frustoconical recessed structure.

14. The energy storage device according to claim 13, wherein, in a plan view, the frustoconical recessed structure overlaps with the frustoconical structure.

15. The energy storage device according to claim 13, wherein, in a plan view, outer edges of the frustoconical recessed structure are aligned with outer edges of the frustoconical structure.

16. The energy storage device according to claim 1, wherein one side of the through hole extends in the attachment portion and another side of the through hole extends in the recessed portion.

17. The energy storage device according to claim 1, wherein one side of the through hole extends in a bottom surface of the attachment portion that faces the second connecting portion, and another side of the through hole extends in a bottom surface of the recessed portion that faces the electrode terminal.

18. The energy storage device according to claim 17, wherein the bottom surface of the recessed portion includes a top surface of the attachment portion.

19. An energy storage device, comprising:
an electrode terminal;
an electrode assembly; and
a current collector which connects the electrode terminal and the electrode assembly,
wherein the current collector includes:
a first connecting portion which is connected with the electrode terminal; and
a second connecting portion which is connected with the electrode assembly and the first connecting portion,
wherein the first connecting portion includes:
a base portion which is connected to the second connecting portion; and
an attachment portion which is provided to protrude from the base portion in a direction which is opposite to a direction toward the electrode terminal,
wherein, in the attachment portion, a through hole through which a shaft portion of the electrode terminal is inserted is formed,
wherein the base portion includes a folded portion of a plate material, the plate material forming the current collector, and
wherein the folded portion of a plate material extends to a position adjacent to the through hole.

20. The energy storage device according to claim 19, wherein the attachment portion comprises a flat surface that continuously extends from the folded portion to the through hole.

* * * * *